US 7,851,005 B2

(12) United States Patent
Bingley et al.

(10) Patent No.: US 7,851,005 B2
(45) Date of Patent: Dec. 14, 2010

(54) TASTE POTENTIATOR COMPOSITIONS AND BEVERAGES CONTAINING SAME

(75) Inventors: Carole A. Bingley, Caversham (GB); Katherine Clare Darnell, Wokingham (GB)

(73) Assignee: Cadbury Adams USA LLC, Parsippany, NJ (US)

(*) Notice: Subject to any disclaimer, the term of this patent is extended or adjusted under 35 U.S.C. 154(b) by 1136 days.

(21) Appl. No.: 11/439,832

(22) Filed: May 23, 2006

(65) Prior Publication Data
US 2006/0286259 A1    Dec. 21, 2006

Related U.S. Application Data

(60) Provisional application No. 60/683,634, filed on May 23, 2005, provisional application No. 60/789,667, filed on Apr. 6, 2006, provisional application No. 60/760,437, filed on Jan. 20, 2006.

(51) Int. Cl.
*A23L 1/09* (2006.01)
*A23L 1/236* (2006.01)

(52) U.S. Cl. .................. 426/548; 426/590; 426/541; 426/534; 426/544; 426/658; 424/49; 514/772; 514/53

(58) Field of Classification Search ............ 426/590, 426/548, 541, 534, 544, 658; 424/49; 514/772, 514/53
See application file for complete search history.

(56) References Cited

U.S. PATENT DOCUMENTS

| | | | |
|---|---|---|---|
| 1,633,336 A | 6/1927 | Larson | |
| 1,936,456 A | 11/1933 | Larson et al. | |
| 2,191,199 A | 2/1940 | Hall | |
| 2,197,719 A | 4/1940 | Conner | |
| 2,876,167 A | 3/1959 | Manahan | |
| 2,886,440 A | 5/1959 | Kramer et al. | |
| 2,886,441 A | 5/1959 | Kramer et al. | |
| 2,886,442 A | 5/1959 | Kramer et al. | |
| 2,886,443 A | 5/1959 | Rosenthal et al. | |
| 2,886,444 A | 5/1959 | Rosenthal et al. | |
| 2,886,445 A | 5/1959 | Rosenthal et al. | |
| 2,886,446 A | 5/1959 | Kramer et al. | |
| 2,886,449 A | 5/1959 | Rosenthal et al. | |
| 3,004,897 A | 10/1961 | Shore | |
| 3,052,552 A | 9/1962 | Koerner et al. | |
| 3,117,027 A | 1/1964 | Lindlof et al. | |
| 3,124,459 A | 3/1964 | Erwin | |
| 3,159,585 A | 12/1964 | Evans et al. | |
| 3,241,520 A | 3/1966 | Wurster et al. | |
| 3,475,533 A | 10/1969 | Mayrand | |
| 3,538,230 A | 11/1970 | Pader et al. | |
| 3,664,962 A | 5/1972 | Kelly et al. | |
| 3,664,963 A | 5/1972 | Paslin | |
| 3,677,771 A | 7/1972 | Kolar, Jr. | |
| 3,795,744 A | 3/1974 | Ogawa et al. | |
| 3,819,838 A | 6/1974 | Smith et al. | |
| 3,821,417 A | 6/1974 | Westall et al. | |
| 3,826,847 A | 7/1974 | Ogawa et al. | |
| 3,857,964 A | 12/1974 | Yolles | |
| 3,862,307 A | 1/1975 | Di Giulio | |
| 3,872,021 A | 3/1975 | McKnight | |
| 3,878,938 A | 4/1975 | Venables et al. | |
| 3,912,817 A | 10/1975 | Sapsowitz | |
| 3,930,026 A | 12/1975 | Clark | |
| 3,943,258 A | 3/1976 | Bahoshy et al. | |
| 3,962,416 A | 6/1976 | Katzen | |
| 3,962,463 A | 6/1976 | Witzel | |
| 3,974,293 A | 8/1976 | Witzel | |
| 3,984,574 A | 10/1976 | Comollo | |
| 4,032,661 A | 6/1977 | Rowsell et al. | |
| 4,037,000 A | 7/1977 | Burge et al. | |
| 4,045,581 A | 8/1977 | Mackay et al. | |
| 4,083,995 A | 4/1978 | Mitchell et al. | |
| 4,107,360 A | 8/1978 | Schmidgall | |
| 4,130,638 A | 12/1978 | Dhabhar et al. | |
| 4,136,163 A | 1/1979 | Watson et al. | |
| 4,139,639 A | 2/1979 | Bahoshy et al. | |
| 4,148,872 A | 4/1979 | Wagenknecht et al. | |
| 4,150,112 A | 4/1979 | Wagenknecht et al. | |
| 4,156,715 A | 5/1979 | Wagenknecht et al. | |

(Continued)

FOREIGN PATENT DOCUMENTS

CA          1 208 966          5/1986

(Continued)

OTHER PUBLICATIONS

Anonymous; "Caprol 3GO CAS No. 9007-48-1" XP002401201. Retrieved from the Internet: URL: http://www.abiteccorp.com/documents/3go-17_000.pdf (retrieved Sep. 28, 2006).

(Continued)

*Primary Examiner*—Jennifer C McNeil
*Assistant Examiner*—Hong Mehta
(74) *Attorney, Agent, or Firm*—Cantor Colburn LLP

(57) ABSTRACT

The present invention relates to oral compositions and beverage products, which include taste potentiators to enhance the perception of active substances contained therein. More specifically, some embodiments provide potentiator compositions, which include at least one active substance, such as a sweetener, and at least one potentiator, such as a sweetness potentiator, which enhances the sweetness of the composition upon consumption.

50 Claims, 10 Drawing Sheets

U.S. PATENT DOCUMENTS

| | | |
|---|---|---|
| 4,156,716 A | 5/1979 | Wagenknecht et al. |
| 4,157,385 A | 6/1979 | Wagenknecht et al. |
| 4,159,315 A | 6/1979 | Wagenknecht et al. |
| 4,160,054 A | 7/1979 | Wagenknecht et al. |
| 4,160,820 A | 7/1979 | Wagenknecht et al. |
| 4,187,320 A | 2/1980 | Koch et al. |
| 4,208,431 A | 6/1980 | Friello et al. |
| 4,217,368 A | 8/1980 | Witzel et al. |
| 4,224,345 A | 9/1980 | Tezuka et al. |
| 4,230,688 A | 10/1980 | Rowsell et al. |
| 4,271,199 A | 6/1981 | Cherukuri et al. |
| 4,276,312 A | 6/1981 | Merritt |
| 4,295,845 A | 10/1981 | Sepulveda et al. |
| 4,314,990 A | 2/1982 | Denny, Jr. et al. |
| 4,340,583 A | 7/1982 | Wason |
| 4,352,823 A | 10/1982 | Cherukuri et al. |
| 4,352,825 A | 10/1982 | Cherukuri et al. |
| 4,363,756 A | 12/1982 | Sepulveda et al. |
| 4,384,004 A | 5/1983 | Cea et al. |
| 4,386,106 A | 5/1983 | Merritt et al. |
| 4,452,821 A | 6/1984 | Gergely |
| 4,457,857 A | 7/1984 | Sepulveda et al. |
| 4,459,425 A | 7/1984 | Amano et al. |
| 4,485,118 A | 11/1984 | Carroll et al. |
| 4,513,012 A | 4/1985 | Carroll et al. |
| 4,515,769 A | 5/1985 | Merritt et al. |
| 4,585,649 A | 4/1986 | Lynch |
| 4,590,075 A | 5/1986 | Wei et al. |
| 4,597,970 A | 7/1986 | Sharma et al. |
| 4,603,012 A | 7/1986 | Zanno et al. |
| 4,614,649 A | 9/1986 | Gorman et al. |
| 4,614,654 A | 9/1986 | Ream et al. |
| 4,619,834 A | 10/1986 | Zanno et al. |
| 4,622,232 A | 11/1986 | Zanno et al. |
| 4,622,417 A | 11/1986 | Barnett et al. |
| 4,627,987 A | 12/1986 | Barnett et al. |
| 4,634,593 A | 1/1987 | Stroz et al. |
| 4,636,396 A | 1/1987 | Zanno et al. |
| 4,650,688 A | 3/1987 | Roy et al. |
| 4,652,457 A | 3/1987 | Zanno et al. |
| 4,654,219 A | 3/1987 | Barnett et al. |
| 4,673,577 A | 6/1987 | Patel |
| 4,676,989 A | 6/1987 | Barnett et al. |
| 4,678,674 A | 7/1987 | Zanno et al. |
| 4,678,675 A | 7/1987 | Zanno et al. |
| 4,701,552 A | 10/1987 | Zanno et al. |
| 4,711,784 A | 12/1987 | Yang |
| 4,722,845 A | 2/1988 | Cherukuri et al. |
| 4,724,151 A | 2/1988 | Mansukhani et al. |
| 4,726,953 A | 2/1988 | Carroll et al. |
| 4,740,376 A | 4/1988 | Yang |
| 4,741,905 A | 5/1988 | Huzinec |
| 4,749,575 A | 6/1988 | Rotman |
| 4,751,095 A | 6/1988 | Karl et al. |
| 4,752,481 A | 6/1988 | Dokuzovic |
| 4,753,790 A | 6/1988 | Silva et al. |
| 4,758,443 A | 7/1988 | Roy et al. |
| 4,771,784 A | 9/1988 | Kozin et al. |
| 4,781,927 A | 11/1988 | Zanno et al. |
| 4,788,073 A | 11/1988 | Zanno et al. |
| 4,800,087 A | 1/1989 | Mehta |
| 4,804,548 A | 2/1989 | Sharma et al. |
| 4,816,265 A | 3/1989 | Cherukuri et al. |
| 4,822,599 A | 4/1989 | Mitra |
| 4,822,635 A | 4/1989 | Zanno et al. |
| 4,824,681 A | 4/1989 | Schobel et al. |
| 4,828,845 A | 5/1989 | Zamudio-Tena et al. |
| 4,828,857 A | 5/1989 | Sharma et al. |
| 4,842,762 A | 6/1989 | Sabol, Jr. et al. |
| 4,871,570 A | 10/1989 | Barnett et al. |
| 4,904,482 A | 2/1990 | Patel et al. |
| 4,911,934 A | 3/1990 | Yang et al. |
| 4,915,958 A | 4/1990 | Faust et al. |
| 4,918,182 A | 4/1990 | Jackson et al. |
| 4,919,841 A | 4/1990 | Kamel et al. |
| 4,923,684 A | 5/1990 | Ibrahim et al. |
| 4,927,646 A | 5/1990 | Jenner et al. |
| 4,929,447 A | 5/1990 | Yang |
| 4,931,293 A | 6/1990 | Cherukuri et al. |
| 4,933,190 A | 6/1990 | Cherukuri et al. |
| 4,952,407 A | 8/1990 | Record et al. |
| 4,971,797 A | 11/1990 | Cherukuri et al. |
| 4,971,806 A | 11/1990 | Cherukuri et al. |
| 4,978,537 A | 12/1990 | Song |
| 4,981,698 A | 1/1991 | Cherukuri et al. |
| 4,985,236 A | 1/1991 | Ibrahim et al. |
| 4,986,991 A | 1/1991 | Yatka et al. |
| 4,997,659 A | 3/1991 | Yatka et al. |
| 5,004,595 A | 4/1991 | Cherukuri et al. |
| 5,009,893 A | 4/1991 | Cherukuri et al. |
| 5,009,900 A | 4/1991 | Levine et al. |
| 5,017,385 A | 5/1991 | Wienecke |
| 5,043,154 A | 8/1991 | Gaffar et al. |
| 5,043,169 A | 8/1991 | Cherukuri et al. |
| 5,057,327 A | 10/1991 | Yatka et al. |
| 5,057,328 A | 10/1991 | Cherukuri et al. |
| 5,059,429 A | 10/1991 | Cherukuri et al. |
| 5,064,658 A | 11/1991 | Cherukuri et al. |
| 5,073,389 A | 12/1991 | Wienecke |
| 5,080,877 A | 1/1992 | Chane-Ching et al. |
| 5,082,671 A | 1/1992 | Cherukuri |
| 5,084,278 A | 1/1992 | Mehta |
| 5,085,850 A | 2/1992 | Pan et al. |
| 5,096,699 A | 3/1992 | Gaffar et al. |
| 5,096,701 A | 3/1992 | White, Jr. et al. |
| 5,100,678 A | 3/1992 | Reed et al. |
| 5,108,763 A | 4/1992 | Chau et al. |
| 5,126,151 A | 6/1992 | Bodor et al. |
| 5,139,793 A | 8/1992 | Johnson et al. |
| 5,139,794 A | 8/1992 | Patel et al. |
| 5,139,798 A | 8/1992 | Yatka et al. |
| 5,154,939 A | 10/1992 | Broderick et al. |
| 5,164,210 A | 11/1992 | Campbell et al. |
| 5,169,657 A | 12/1992 | Yatka et al. |
| 5,169,658 A | 12/1992 | Yatka et al. |
| 5,174,514 A | 12/1992 | Prodi |
| 5,176,900 A | 1/1993 | White, Jr. et al. |
| 5,192,563 A | 3/1993 | Patel et al. |
| 5,198,251 A | 3/1993 | Song et al. |
| 5,202,112 A | 4/1993 | Prencipe et al. |
| 5,208,009 A | 5/1993 | Gaffar et al. |
| 5,226,335 A | 7/1993 | Sitte et al. |
| 5,227,182 A | 7/1993 | Song et al. |
| 5,229,148 A | 7/1993 | Copper |
| 5,232,735 A | 8/1993 | Kurtz et al. |
| 5,240,710 A | 8/1993 | Bar-Shalom et al. |
| 5,256,402 A | 10/1993 | Prencipe et al. |
| 5,266,336 A | 11/1993 | McGrew et al. |
| 5,266,592 A | 11/1993 | Grub et al. |
| 5,273,741 A | 12/1993 | Gaftar et al. |
| 5,300,283 A | 4/1994 | Prencipe et al. |
| 5,334,375 A | 8/1994 | Nabi et al. |
| 5,334,396 A | 8/1994 | Yatka |
| 5,336,509 A | 8/1994 | McGrew et al. |
| 5,352,439 A | 10/1994 | Norfleet et al. |
| 5,364,627 A | 11/1994 | Song |
| 5,372,824 A | 12/1994 | Record et al. |
| 5,380,530 A | 1/1995 | Hill |
| 5,385,729 A | 1/1995 | Prencipe et al. |
| 5,391,315 A | 2/1995 | Ashkin |
| 5,407,665 A | 4/1995 | McLaughlin et al. |
| 5,413,799 A | 5/1995 | Song et al. |
| 5,415,880 A | 5/1995 | Song et al. |
| 5,431,930 A | 7/1995 | Patel et al. |

| | | | |
|---|---|---|---|
| 5,437,876 A | 8/1995 | Synosky et al. | |
| 5,437,878 A | 8/1995 | Panhorst et al. | |
| 5,458,879 A | 10/1995 | Singh et al. | |
| 5,462,754 A | 10/1995 | Synosky et al. | |
| 5,474,787 A | 12/1995 | Grey et al. | |
| 5,480,668 A | 1/1996 | Nofre et al. | |
| 5,487,902 A | 1/1996 | Andersen et al. | |
| 5,498,378 A | 3/1996 | Tsaur et al. | |
| 5,501,864 A | 3/1996 | Song et al. | |
| 5,503,823 A | 4/1996 | Norfleet et al. | |
| 5,505,933 A | 4/1996 | Norfleet et al. | |
| 5,523,098 A | 6/1996 | Synosky et al. | |
| 5,532,004 A | 7/1996 | Bell et al. | |
| 5,545,424 A | 8/1996 | Nakatsu et al. | |
| 5,582,816 A | 12/1996 | Mandanas et al. | |
| 5,589,160 A | 12/1996 | Rice | |
| 5,589,194 A | 12/1996 | Tsuei et al. | |
| 5,599,527 A | 2/1997 | Hsu et al. | |
| 5,603,920 A | 2/1997 | Rice | |
| 5,603,971 A | 2/1997 | Porzio et al. | |
| 5,618,517 A | 4/1997 | Miskewitz | |
| 5,626,892 A | 5/1997 | Kehoe et al. | |
| 5,629,035 A | 5/1997 | Miskewitz | |
| 5,637,618 A | 6/1997 | Kurtz et al. | |
| 5,645,821 A | 7/1997 | Libin | |
| 5,651,958 A | 7/1997 | Rice | |
| 5,658,553 A | 8/1997 | Rice | |
| 5,676,932 A | 10/1997 | Wason et al. | |
| 5,679,397 A | 10/1997 | Kuroda et al. | |
| 5,693,334 A | 12/1997 | Miskewitz | |
| 5,698,215 A | 12/1997 | Kalili et al. | |
| 5,702,687 A | 12/1997 | Miskewitz | |
| 5,713,738 A | 2/1998 | Yarborough | |
| 5,716,601 A | 2/1998 | Rice | |
| 5,736,175 A | 4/1998 | Cea et al. | |
| 5,756,074 A | 5/1998 | Ascione et al. | |
| 5,789,002 A | 8/1998 | Duggan et al. | |
| 5,795,616 A | 8/1998 | Greenberg | |
| 5,800,848 A | 9/1998 | Yatka et al. | |
| 5,824,291 A | 10/1998 | Howard | |
| 5,869,028 A | 2/1999 | McGill et al. | |
| 5,879,728 A | 3/1999 | Graff et al. | |
| 5,912,007 A | 6/1999 | Pan et al. | |
| 5,912,030 A | 6/1999 | Huzinec et al. | |
| 5,939,051 A | 8/1999 | Santalucia et al. | |
| 6,027,746 A | 2/2000 | Lech | |
| 6,056,992 A | 5/2000 | Lew | |
| 6,159,509 A | 12/2000 | Johnson et al. | |
| 6,174,514 B1 | 1/2001 | Cherukuri et al. | |
| 6,190,644 B1 | 2/2001 | McClanahan et al. | |
| 6,238,690 B1 | 5/2001 | Kiefer et al. | |
| 6,261,540 B1 | 7/2001 | Nelson | |
| 6,290,933 B1 | 9/2001 | Durga et al. | |
| 6,365,209 B2 | 4/2002 | Cherukuri | |
| 6,368,651 B1 * | 4/2002 | Gerlat et al. | 426/548 |
| 6,379,654 B1 | 4/2002 | Gebreselassie et al. | |
| 6,416,744 B1 | 7/2002 | Robinson et al. | |
| 6,428,827 B1 | 8/2002 | Song et al. | |
| 6,461,658 B1 | 10/2002 | Merkel et al. | |
| 6,471,945 B2 | 10/2002 | Luo et al. | |
| 6,475,469 B1 | 11/2002 | Montgomery | |
| 6,479,071 B2 | 11/2002 | Holme et al. | |
| 6,485,739 B2 | 11/2002 | Luo et al. | |
| 6,506,366 B1 | 1/2003 | Leinen et al. | |
| 6,534,091 B1 | 3/2003 | Garces Garces et al. | |
| 6,555,145 B1 | 4/2003 | Cherukuri | |
| 6,627,233 B1 | 9/2003 | Wolf et al. | |
| 6,627,234 B1 | 9/2003 | Johnson et al. | |
| 6,685,916 B1 | 2/2004 | Holme et al. | |
| 6,692,778 B2 | 2/2004 | Yatka et al. | |
| 6,696,044 B2 | 2/2004 | Luo et al. | |
| 6,759,066 B2 | 7/2004 | Savage et al. | |
| 6,761,879 B1 | 7/2004 | Finidori | |
| 6,780,443 B1 | 8/2004 | Nakatsu et al. | |
| 6,955,887 B2 | 10/2005 | Adler et al. | |
| 6,974,597 B2 | 12/2005 | Ohta et al. | |
| 7,022,352 B2 | 4/2006 | Castro et al. | |
| 7,025,999 B2 | 4/2006 | Johnson et al. | |
| 2002/0044968 A1 | 4/2002 | Van Lengerich | |
| 2002/0054859 A1 | 5/2002 | Alvarez Hernandez | |
| 2002/0122842 A1 | 9/2002 | Seielstad et al. | |
| 2002/0150616 A1 | 10/2002 | Vandecruys | |
| 2003/0026878 A1 | 2/2003 | Corriveau et al. | |
| 2003/0054448 A1 | 3/2003 | Adler et al. | |
| 2003/0059519 A1 | 3/2003 | Merkel et al. | |
| 2003/0072842 A1 | 4/2003 | Johnson et al. | |
| 2003/0077362 A1 | 4/2003 | Panhorst et al. | |
| 2003/0091721 A1 | 5/2003 | Ohta et al. | |
| 2003/0099740 A1 | 5/2003 | Colle et al. | |
| 2003/0113274 A1 | 6/2003 | Holme et al. | |
| 2003/0170608 A1 | 9/2003 | Pronin et al. | |
| 2003/0232407 A1 | 12/2003 | Zoller et al. | |
| 2004/0072254 A1 | 4/2004 | Callamaras et al. | |
| 2004/0132075 A1 | 7/2004 | Elliot et al. | |
| 2004/0136928 A1 | 7/2004 | Holme et al. | |
| 2004/0146599 A1 | 7/2004 | Andersen et al. | |
| 2004/0171042 A1 | 9/2004 | Adler et al. | |
| 2004/0175489 A1 | 9/2004 | Clark et al. | |
| 2004/0175792 A1 | 9/2004 | Zoller et al. | |
| 2004/0175793 A1 | 9/2004 | Zoller et al. | |
| 2004/0185469 A1 | 9/2004 | Zoller et al. | |
| 2004/0191805 A1 | 9/2004 | Adler et al. | |
| 2004/0209286 A1 | 10/2004 | Adler et al. | |
| 2004/0229239 A1 | 11/2004 | Adler et al. | |
| 2004/0238993 A1 | 12/2004 | Benczedi et al. | |
| 2005/0013915 A1 | 1/2005 | Riha et al. | |
| 2005/0025721 A1 | 2/2005 | Holme et al. | |
| 2005/0032158 A1 | 2/2005 | Adler et al. | |
| 2005/0037121 A1 | 2/2005 | Rathjen | |
| 2005/0069944 A1 | 3/2005 | Adler | |
| 2005/0084506 A1 | 4/2005 | Tachdjian et al. | |
| 2005/0084932 A1 | 4/2005 | Zoller et al. | |
| 2005/0112236 A1 | 5/2005 | Boghani et al. | |
| 2005/0214348 A1 | 9/2005 | Boghani et al. | |
| 2005/0220867 A1 | 10/2005 | Boghani et al. | |
| 2005/0260266 A1 | 11/2005 | Gebreselassie et al. | |
| 2005/0287517 A1 | 12/2005 | Adler et al. | |
| 2006/0034897 A1 | 2/2006 | Boghani et al. | |
| 2006/0159820 A1 | 7/2006 | Rathjen et al. | |
| 2006/0193896 A1 | 8/2006 | Boghani et al. | |
| 2006/0263413 A1 | 11/2006 | Boghani et al. | |
| 2006/0263472 A1 | 11/2006 | Boghani et al. | |
| 2006/0263473 A1 | 11/2006 | Boghani et al. | |
| 2006/0263477 A1 | 11/2006 | Boghani et al. | |
| 2006/0263478 A1 | 11/2006 | Boghani et al. | |
| 2006/0263479 A1 | 11/2006 | Boghani et al. | |
| 2006/0263480 A1 | 11/2006 | Boghani et al. | |

FOREIGN PATENT DOCUMENTS

| | | |
|---|---|---|
| CA | 2 238 925 | 11/1999 |
| DE | 196 53 100 | 7/1998 |
| EP | 0 067 595 | 12/1982 |
| EP | 0 134 120 | 8/1984 |
| EP | 0 132 444 | 2/1985 |
| EP | 201077 A1 | 11/1986 |
| EP | 201078 A1 | 11/1986 |
| EP | 203540 A1 | 12/1986 |
| EP | 0 252 374 | 1/1988 |
| EP | 0 255 260 | 2/1988 |
| EP | 256475 A2 | 2/1988 |
| EP | 0 434 321 | 6/1991 |
| EP | 0 453 397 | 10/1991 |
| EP | 0 608 712 | 8/1994 |
| ES | 2 080 703 | 2/1996 |
| ES | 2 190 875 | 8/2003 |

| | | |
|---|---|---|
| GB | 875763 | 8/1961 |
| GB | 1444024 | 7/1976 |
| GB | 2 388 581 | 11/2003 |
| JP | 53-136566 | 11/1978 |
| JP | 02-083030 | 3/1990 |
| JP | 02-227044 | 9/1990 |
| JP | 01/206969 | 7/2001 |
| RO | 85679 | 11/1984 |
| WO | WO 85/03414 | 8/1985 |
| WO | WO 88/00463 | 1/1988 |
| WO | WO 89/03170 | 4/1989 |
| WO | WO 89/11212 | 11/1989 |
| WO | WO 90/04926 | 5/1990 |
| WO | WO 90/07859 | 7/1990 |
| WO | WO 90/12512 | 11/1990 |
| WO | WO 90/13994 | 11/1990 |
| WO | WO 91/07104 | 5/1991 |
| WO | WO 92/02145 | 2/1992 |
| WO | WO 92/06160 | 4/1992 |
| WO | 93/23005 A1 | 11/1993 |
| WO | 93/25177 A1 | 12/1993 |
| WO | WO 95/33034 | 12/1995 |
| WO | WO 96/08166 | 3/1996 |
| WO | WO 96/19193 | 6/1996 |
| WO | WO 97/02009 | 1/1997 |
| WO | WO 97/02011 | 1/1997 |
| WO | WO 98/03076 | 1/1998 |
| WO | WO 98/15192 | 4/1998 |
| WO | WO 98/18339 | 5/1998 |
| WO | WO 98/23165 | 6/1998 |
| WO | WO 98/29088 | 7/1998 |
| WO | WO 99/15032 | 4/1999 |
| WO | WO 99/27798 | 6/1999 |
| WO | WO 99/43294 | 9/1999 |
| WO | WO 99/62354 | 12/1999 |
| WO | WO 00/01253 | 1/2000 |
| WO | WO 00/35296 | 6/2000 |
| WO | WO 00/35298 | 6/2000 |
| WO | WO 00/36924 | 6/2000 |
| WO | WO 00/69282 | 11/2000 |
| WO | WO 00/75274 | 12/2000 |
| WO | WO 01/76384 | 10/2001 |
| WO | WO 02/00039 | 1/2002 |
| WO | WO 02/47489 | 6/2002 |
| WO | WO 02/055649 | 7/2002 |
| WO | WO 02/076231 | 10/2002 |
| WO | WO 02087358 A1 * | 11/2002 |
| WO | WO 02/102362 | 12/2002 |
| WO | WO 03/063604 | 8/2003 |
| WO | WO 2004/006967 | 1/2004 |
| WO | WO 2004/077956 | 9/2004 |
| WO | WO 2005/016022 | 2/2005 |
| WO | WO 2005/051427 | 6/2005 |
| WO | WO 2005/079598 | 9/2005 |
| WO | WO 2005/087020 | 9/2005 |
| WO | WO 2005/091918 | 10/2005 |
| WO | WO 2006/003349 | 1/2006 |
| WO | WO 2006/079056 | 7/2006 |
| WO | WO 2006/086061 | 8/2006 |
| WO | 2006/127934 A2 | 11/2006 |
| WO | 2006/127935 A1 | 11/2006 |
| WO | 2006/127936 A2 | 11/2006 |
| WO | 2006132057 A1 | 12/2006 |
| WO | 2007/084185 A1 | 7/2007 |
| WO | 2007121599 A1 | 11/2007 |
| WO | 2007121600 A1 | 11/2007 |
| WO | 2007121604 A2 | 11/2007 |

OTHER PUBLICATIONS

Anonymous; "HLB Systems" [Online] pp. 1-4, XP002401202. Retrieved from the Internet: URL: http://pharmcal.tripod.com/ch17.htm. (retrieved Sep. 28, 2006).

R. Deis, "Customizing Sweetness Profiles", retrieved from the internet: www.efenbeonline.com/view_story.asp?type=Story&id.864#, p. 1-4, Oct. 6, 2006.

JP 02083030 A—Lion Corp., "Microcapsule for Foods", Mar. 23, 1990, Abstract.

Rassing, M.R.; Chewing Gum as a Drug Delivery System: Advanced Drug Delivery Reviews, vol. 13 (1994); No. 1-2, pp. 89-121.

J. Agric. Food Chem. 2004, 52, 8119-8126, Istabel Ovejero-Lopez, Anne-Mette Haahr, Frans Van Den Berg, and Wender L.P. Bredie, Flavor Release Measurement from Gum Model System.

Prencipe et al.; Squeezing out a better toothpaste; Chemtech, Dec. 1995; http://pubs.acs.org/hotartcl/chemtech/95/dec/dec.html; printed Apr. 20, 2004; pp. 1-7.

Gantrez® AN; ISP Polymers for Oral Care; http://www.ispcorp.com/products/oralcare/content/brochure/oral/prod.html, printed Jun. 9, 2004, pp. 1-5.

Demmers et al.; Effect of Surfactants and Proteolytic Enzymes on Artificial Calculus Formation; Surfactants and Enzymes; Calculus; pp. 28-35, Aug. 1967.

United States Patent Office, Final Office Action Dated: Nov. 30, 2009, U.S. Appl. No. 11/439,811, 14 pages.

United States Patent Office, Non Final Office Action Dated: Mar. 5, 2009, U.S. Appl. No. 11/439,811, 11 pages.

United States Patent Office, Final Office Action Dated: Aug. 17, 2009, U.S. Appl. No. 11/439,830, 16 pages.

United States Patent Office, Non Final Office Action Dated: Sep. 29, 2009, U.S. Appl. No. 11/439,830, 19 pages.

United States Patent Office, Non Final Office Action Dated: Jan. 26, 2009, U.S. Appl. No. 11/439,830, 14 pages.

United States Patent Office, Non Final Office Action Dated: Jan. 25, 2010, U.S. Appl. No. 11/500,644, 12 pages.

Cacoveanu et al., Anti Smoke Composition Tablet Capsule containing propolis extract quinine ascorbic acid vitamin aspartic alpha keto glutaric phosphate calcium glutamate, Nov. 30, 1984, XP-002400514, Abstract.

United States Patent Office, Final Office Action, dated: Mar. 11, 2010, U.S. Appl. No. 11/439,830, 25 pages.

United States Patent Office, Non Final Office Action, dated: Feb. 26, 2010, U.S. Appl. No. 11/439,811, 18 pages.

International Searching Authority, International Search Report, PCT/US2006/030664, Date of mailing: Feb. 1, 2007, 6 pages.

International Searching Authority, Written Opinion, PCT/US2006/030664, Date of mailing: Feb. 1, 2007, 5 pages.

United States Patent and Trademark Office, Final Office Action dated: Jun. 21, 2010, U.S. Appl. No. 11/500,644, 11 pages.

United States Patent and Trademark Office, Final Office Action dated: Jun. 21, 2010, U.S. Appl. No. 11/439, 811, 18 pages.

* cited by examiner 2,4-Dihydroxybenzoic Acid Dose Response

Effect of Blend Dosage on Sucrose Reduction in Model System

3-Hydroxybenzoic Acid Blends 2,4-Dihydroxybenzoic Acid Blends

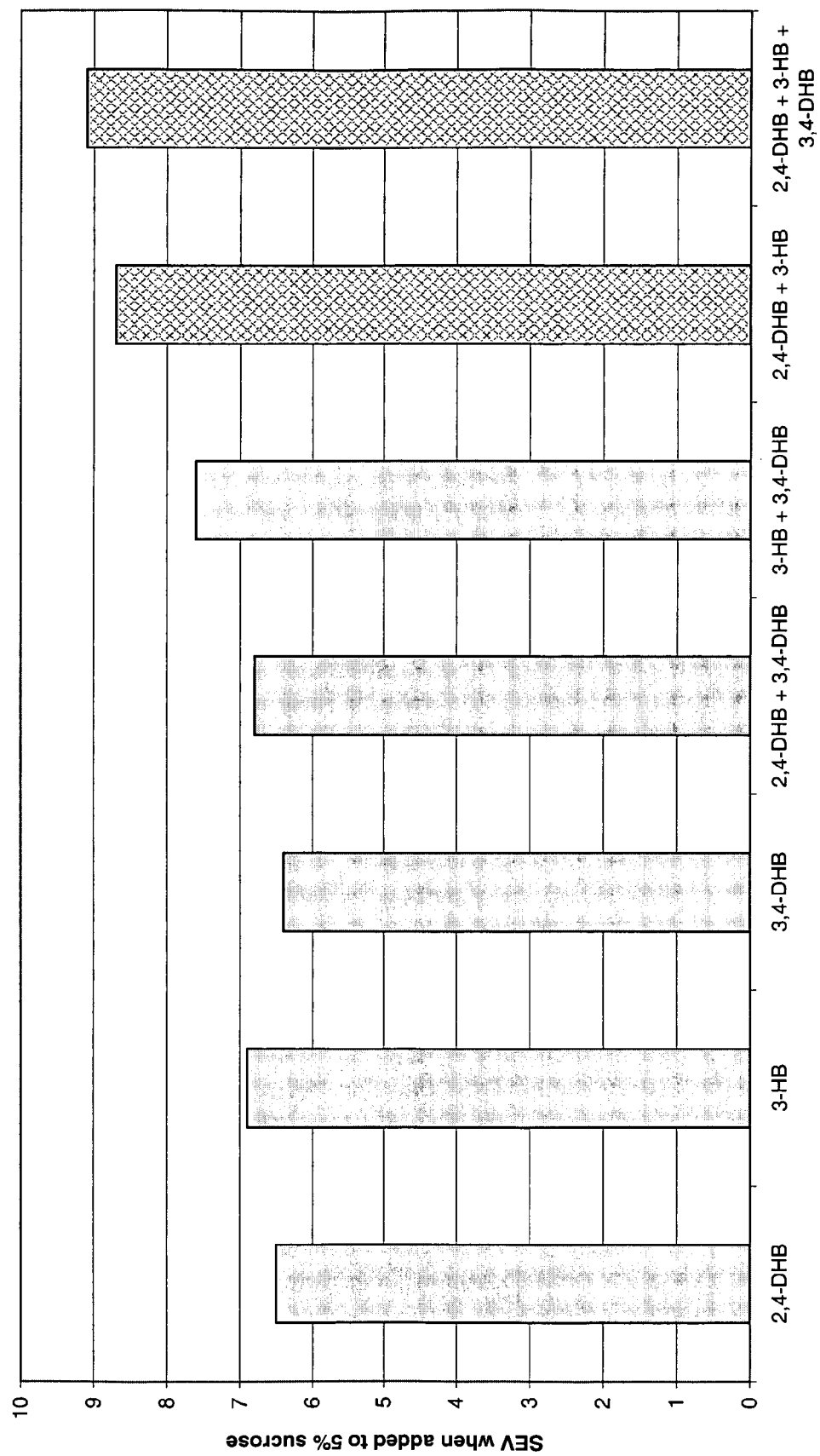

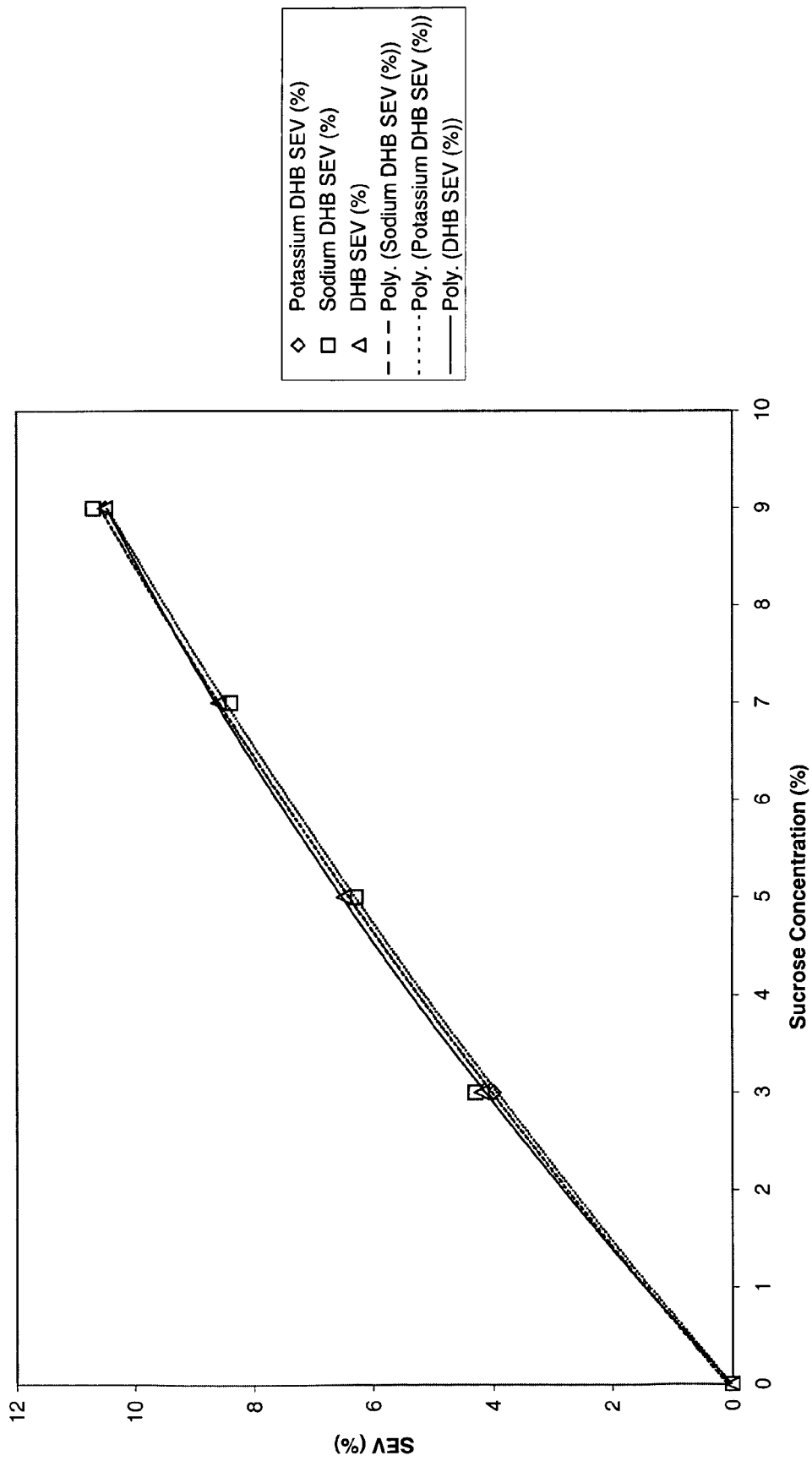

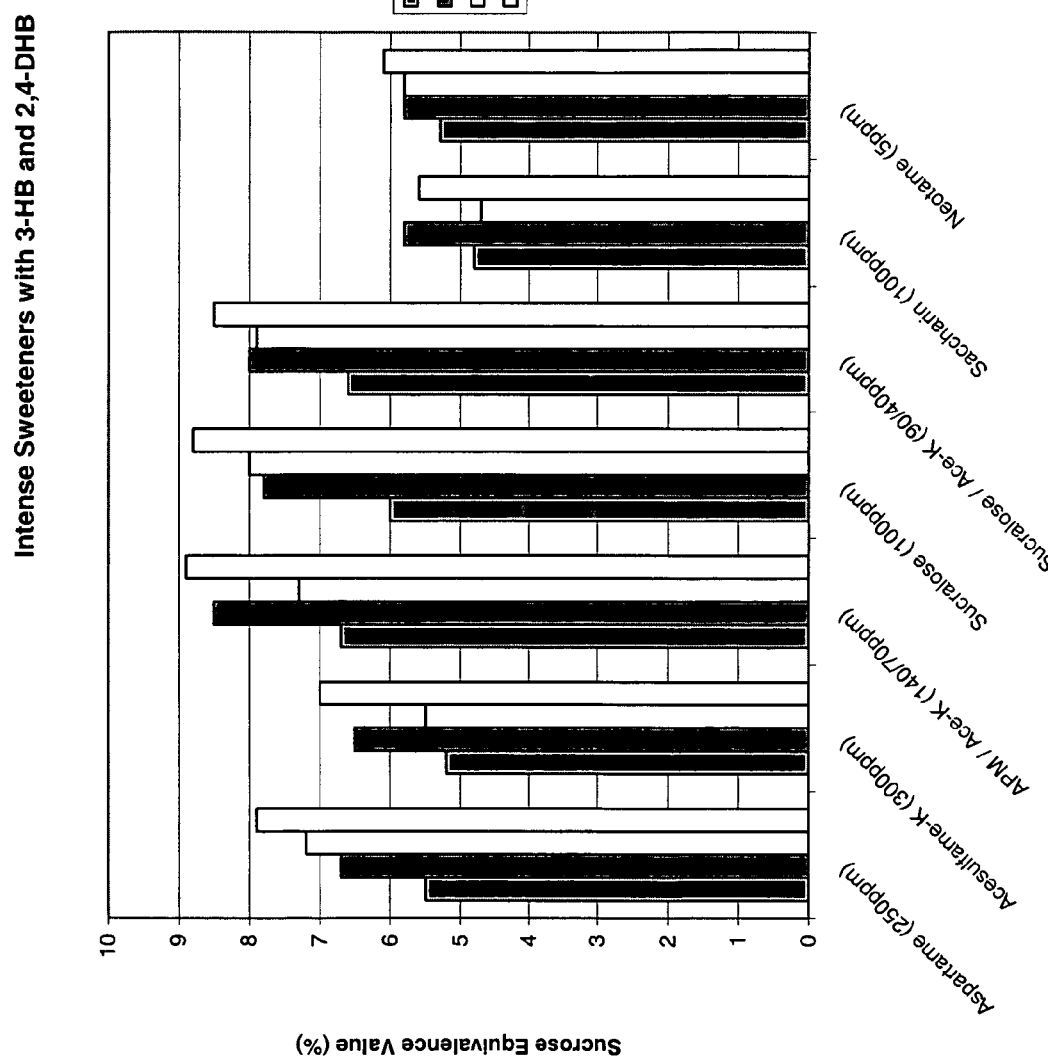

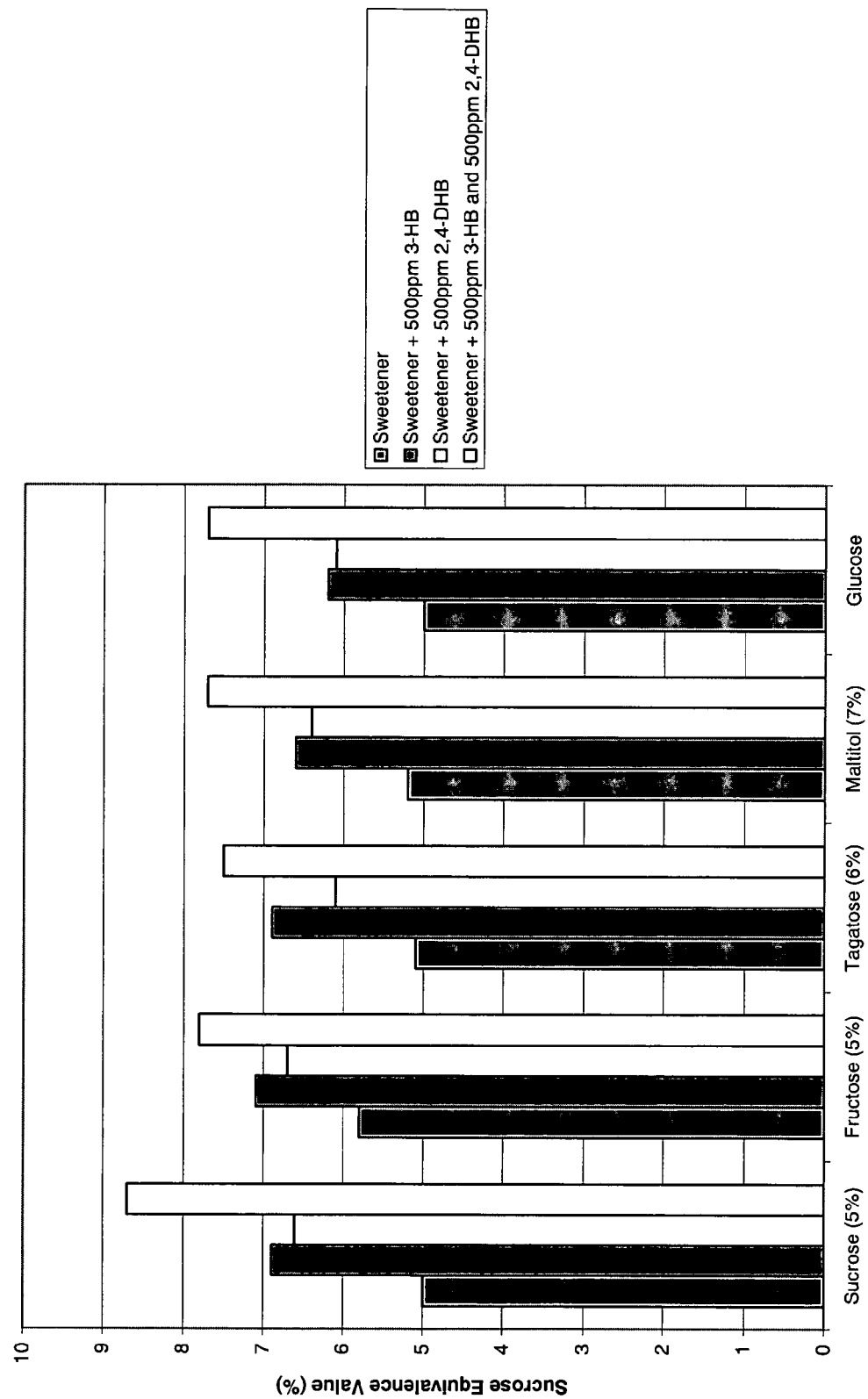

US 7,851,005 B2

TASTE POTENTIATOR COMPOSITIONS AND BEVERAGES CONTAINING SAME

CROSS-REFERENCE TO RELATED APPLICATIONS

This application claims the benefit of U.S. Provisional Application No. 60/683,634, filed May 23, 2005, U.S. Provisional Application No. 60/760,437, filed Jan. 20, 2006 and U.S. Provisional Application No. 60/789,667, filed Apr. 6, 2006, the contents all of which are incorporated herein by reference.

FIELD

The present invention includes oral compositions for use in beverages that provide an enhanced perception of an active substance contained therein. In particular, the compositions may include an active substance, such as a sweetener, and a taste potentiator, which may increase the perception of the active substance upon consumption. The compositions may be incorporated into various types of beverage products, such as juice or carbonated beverages.

BACKGROUND

There are five primary categories of taste that are sensed by humans: sour, salty, sweet, bitter and umami (savory or the taste of glutamate). The taste of a substance is sensed by taste receptor cells located in taste buds primarily on the surface of the tongue and palate in the oral cavity. Each of the primary taste qualities is sensed by a specific mechanism. It is believed that sour and salty tastes are detected by the passage of ions, hydrogen and sodium respectively, through the ion channels in taste bud cells. This triggers a nerve impulse that is sensed in the brain as sour or salty. In contrast, it is believed that sweet, bitter and umami tastes are perceived by physical binding to receptors. In general, sweet, bitter and umami sensing taste cells have G-protein coupled receptors (GPCRs) on their surface. These receptors are activated when they bind to tastants, which initiates a series of signaling events that trigger a nerve impulse that is sensed in the brain as sweet, bitter or savory.

Over the past several years, there have been a number of advances in research on taste perception. New taste receptor proteins have been identified in mammals, particularly two families of G-protein coupled receptors (T2Rs and T1Rs), which are believed to be involved in taste perception. Such receptors are discussed in more detail in International Publication Nos. WO 02/064631 and WO 03/001876. These publications disclose that co-expression of certain T1R receptors results in savory or sweet taste receptors that respond to savory or sweet taste stimuli, respectively.

Recent advances in the understanding of taste perception have created interest in identifying new compounds for stimulating these taste receptors. In particular, research efforts also have been directed to methods of identifying compounds that may enhance the primary taste perceptions, such as sweet or savory perceptions. The development of substances that provide flavor enhancement is of particular interest, and such substances are generally referred to as taste or flavor enhancers, or potentiators. These substances have been thought to contribute taste, aroma and feeling factors, as well as potentiate and suppress other flavors. The activity of taste or flavor enhancers is often referred to as synergistic because they enhance or increase the perception of another substance.

One category of taste potentiators of particular interest are compounds that enhance sweetness. Although naturally occurring carbohydrate sweeteners, such as sucrose, are the most widely used sweeteners, they suffer from the disadvantages of high cost and high caloric content. Artificial sweeteners have been designed that overcome these problems but they are sometimes rejected by the consumer for not having a sufficiently "sucrose-like" taste. Artificial sweeteners have different sweetness profiles from that of sucrose and often suffer from side effects such as delays in the onset of sweetness perception and/or unpleasant aftertastes.

Compounds are known which, when combined with a sweetener, modify the taste of the sweetener. Such compounds are usually referred to as sweetness modifiers or potentiators. They may act to enhance or inhibit the perception of the sweetness of the sweetener or may affect the sweetness profile in some way. For example, Canadian Patent No. 1208966 discloses a broad range of aromatic compounds which are claimed as sweetness modifiers.

European Patent No. 0132444 and U.S. Pat. No. 4,627,987 describe 3-hydroxybenzoic acid (3-HB) as a sweetness potentiator and exemplify its use with sucrose, aspartame and saccharin to enhance sweetness when employed at pH 2.0 to 5.5.

2,4-Dihydroxybenzoic acid (2,4-DHB) also is described as a sweetness potentiator, but the literature is ambiguous as to its effects. In U.S. Pat. No. 5,232,735 it is listed as a "substantially tasteless sweetness inhibitor" whereas in Canadian Patent No. 1208966 the addition of 0.2% 2,4-DHB to a 5% sucrose solution is said to have resulted in an increase in sweetness. International Publication No. WO99/15032 describes the use of 2,4-DHB with aspartame to increase sweetness synergistically and provide a more "sucrose-like" taste and mouthfeel. The combination is considered peculiar, in that the same effect is not observed when 2,4-DHB is combined with the alternative artificial sweeteners, alitame, Ace-K (acesulfame potassium), saccharin or even a mixture of aspartame and Ace-K. U.S. Pat. No. 6,461,658 claims that 2,4-DHB improves the sweetness delivery profile of the artificial sweetener sucralose by significantly reducing the length of time during which sucralose sweetness is perceived. The same effect is not observed for aspartame even though this might be expected in light of International Publication No. WO99/15032. FIGS. 1 and 2 and Tables 1 and 2 of U.S. Pat. No. 6,461,658 seem to indicate that 2,4-DHB has a slightly inhibitory effect on the sweetness intensity of both sucralose and aspartame although this is not discussed in the text.

International Publication No. WO00/69282 describes the modification of the taste and physicochemical properties of the sweetener neotame by the addition of at least one taste modifying hydrophobic acid additive. The taste modifying hydrophobic acid additive is limited only in that it must positively affect at least one taste characteristic imparted by neotame. These characteristics appear to be related to the sweetness profile, specifically the onset and linger period, but the examples do not describe how the characteristics have been affected. 3-HB and 2,4-DHB are listed among a very large number of such additives.

Additionally, there have been a number of recent developments related to methods of identifying substances that function as taste potentiators. Various assays have been developed to identify target compounds that modulate the activity of taste receptors, and thus, may become successful taste potentiators. For example, International Publication Nos. WO 02/064631 and WO 03/001876, referred to above, disclose assays and high-throughput screens that measure certain T1R receptor activity in the presence of target compounds.

U.S. Pat. No. 6,955,887 to Adler et al. discloses methods for identifying taste potentiators using newly identified mammalian taste-cell-specific G-protein coupled receptors. More specifically, U.S. Pat. No. 6,955,887 teaches methods for screening target compounds that may be used to modulate the sweet taste perception.

Various other methods for screening compounds that may be used as taste potentiators are disclosed in the U.S. Patent Publication Nos. 2005/0287517A1, 2005/0084932A1, 2005/0069944A1, 2005/0032158A1, 2004/0229239A1, 2004/0209286A1, 2004/0191805A1, 2004/0185469A1, 2004/0175793A1, 2004/0175792A1, 2004/0171042A1, 2004/0132075A1, 2004/0072254A1, 2003/0232407A1, 2003/0170608A1 and 2003/0054448A1.

Despite progress in developing methods for identifying new taste potentiators, there is still a need for beverages that include such taste potentiators, particularly sweetener potentiators. It would be desirable to develop a sweetener potentiator composition that allows the quantity of natural or artificial sweetener in a beverage product to be reduced, thereby reducing the cost of production and the calorie content of the beverage product, but which avoids adverse effects on flavor.

SUMMARY

In some embodiments there is a beverage composition including at least one active substance and at least one taste potentiator.

In some embodiments there is a beverage composition including a first amount of 3-hydroxybenzoic acid and a second amount of 2,4-dihydroxybenzoic acid.

Some embodiments provide a beverage composition including a first amount of 3-hydroxybenzoic acid and a second amount of 2,4-dihydroxybenzoic acid, wherein the first amount is equal to the second amount.

In some embodiments there is provided a beverage composition, which includes:
 (a) a flavor component;
 (b) a sweetener; and
 (c) a sweetener potentiator composition including:
  (i) a first amount of 3-hydroxybenzoic acid, and
  (ii) a second amount of 2,4-dihydroxybenzoic acid.

In some embodiments there is a method of maintaining a desired sweetness intensity in a beverage composition, which includes the steps of:
 (a) determining a desired sweetness intensity;
 (b) adding a quantity of natural or artificial sweetener to a beverage composition that supplies a sweetness intensity less intense than the desired sweetness intensity; and
 (c) adding a quantity of a sweetener potentiator composition including 3-hydroxybenzoic acid and 2,4-dihydroxybenzoic acid to the beverage composition such that the desired sweetness intensity is delivered.

Some embodiments provide a method of increasing the sweetness intensity of a beverage composition, which includes the steps of:
 (a) adding a quantity of natural or artificial sweetener to a beverage composition;
 (b) determining a sweetness intensity derived from the quantity of the natural or artificial sweetener; and
 (c) adding a quantity of a sweetener potentiator composition including 3-hydroxybenzoic acid and 2,4-dihydroxybenzoic acid to the beverage composition such that the sweetness intensity is greater than the sweetness intensity derived from the natural or artificial sweetener.

In some embodiments there is a method of reducing the amount of natural or artificial sweeteners in a beverage composition, including the steps of:
 (a) determining an amount of natural or artificial sweetener in a beverage composition that provides a desired sweetness intensity;
 (b) reducing the amount of natural or artificial sweetener; and
 (c) adding a quantity of a sweetener potentiator composition containing 3-hydroxybenzoic acid and 2,4-dihydroxybenzoic acid to the beverage composition such that the desired sweetness intensity is maintained.

Some embodiments provide a method of preparing a beverage product, including the steps of:
 (a) providing a sweetener potentiator composition including a first amount of 3-hydroxybenzoic acid and a second amount of 2,4-dihydroxybenzoic acid; and
 (b) adding the sweetener potentiator composition to a beverage composition to enhance the perception of sweetness of the beverage composition upon consumption.

BRIEF DESCRIPTION OF THE DRAWINGS

FIG. 7 is a bar chart of perceived sweetness for a number of solutions containing 3-hydroxybenzoic acid, 2,4-dihydroxybenzoic acid and 3,4-dihydroxybenzoic acid, in various combinations.

FIG. 8 is a graph of perceived sweetness for sucrose solutions containing 2,4-dihydroxybenzoic acid, its potassium salt or its sodium salt against sucrose concentration.

FIG. 9 is a bar chart of perceived sweetness for solutions containing intense sweeteners.

FIG. 10 is a bar chart of perceived sweetness for solutions containing bulk sweeteners.

DETAILED DESCRIPTION

Figure 1:
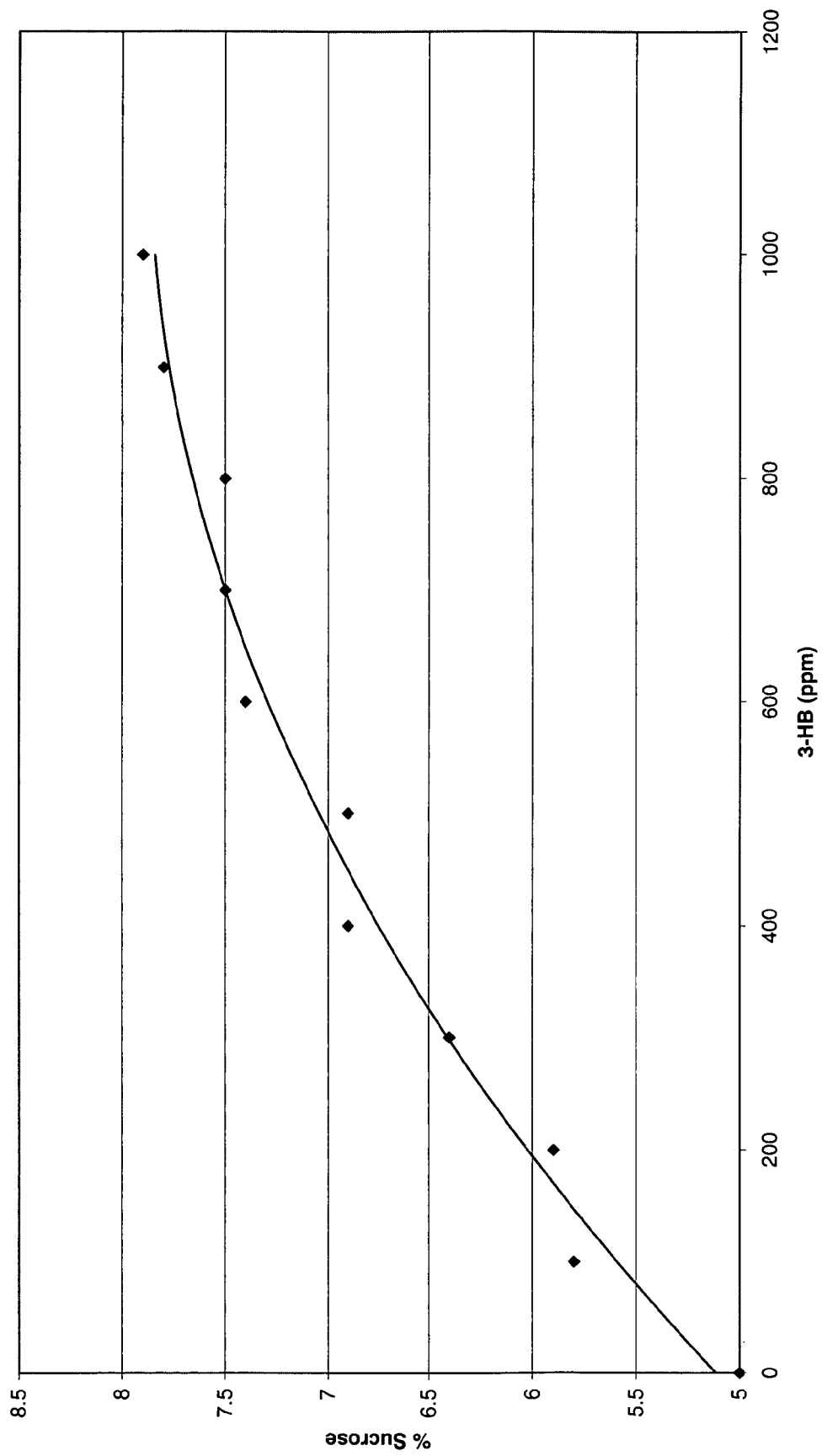
FIG. 1 is a graph of 3-hydroxybenzoic acid concentration against perceived sweetness.

As used herein the transitional term "comprising," (also "comprises," etc.) which is synonymous with "including," "containing," or "characterized by," is inclusive or open-ended and does not exclude additional, unrecited elements or method steps, regardless of its use in the preamble or the body of a claim.

The term "beverage" as used herein means any drinkable liquid or semi-liquid, including for example flavored water, soft drinks, fruit drinks, coffee-based drinks, tea-based drinks, juice-based drinks, milk-based drinks, jelly drinks, carbonated or non-carbonated drinks, alcoholic or non-alcoholic drinks.

The term "beverage concentrate" or "beverage base" as used herein means an intermediate beverage product which, when mixed with an appropriate amount of water or other suitable liquid or semi-liquid and/or a sweetening agent, forms a beverage syrup or alternatively a beverage. The beverage concentrate generally comprises a flavoring agent and optional additives.

The term "beverage syrup" as used herein means an intermediate beverage product prepared from a beverage concentrate, a sweetening agent, and an amount of water or other suitable liquid or semi-liquid. The beverage syrup is in a concentrated form that can be diluted to form a beverage. The beverage syrup generally comprises a flavoring agent, a sweetening agent, and optional additives such as food-grade acids, coloring agents, and the like.

The term "flavor key" as used herein is a flavor component containing flavoring agents such as flavored oils, and the like, and is typically used to prepare a flavor essence.

The term "flavor essence" ("flavor blend", "flavor extract") as used herein is a flavor component generally prepared from a flavor key.

The compositions described herein may contain a portion of added water. As used herein "added water" does not include water incidentally added to the composition through other components such as milk or a fruit juice component, for example. The beverage compositions may contain up to about 99 weight percent (wt %) added water based on the total weight of the composition, specifically about 0.1 to about 90 wt %, more specifically about 1.0 to about 80 wt %, and yet more specifically about 5.0 to about 70 wt % added water each based on the total weight of the composition.

The added water is specifically purified prior to use using processes well-known in the art such as filtration, deionization, distillation, or reverse osmosis.

Embodiments described herein provide compositions for oral delivery of an active substance. Numerous different active substances may be employed, such as, for example, sweeteners. The compositions also may include a taste potentiator, such as a sweetener potentiator. The taste potentiator may act in a synergistic manner when used in conjunction with the active substance to enhance the perception of the active substance during consumption. The compositions may be incorporated into beverage products to enhance the perception of an active, such as a sweetener, used therein.

Potentiator Compositions

Embodiments described herein provide compositions that may include at least one active substance and at least one taste potentiator. The potentiator compositions may have controlled-release properties. The taste potentiator(s) may work synergistically with the active substance(s) to enhance the perception of the active(s). For instance, in some embodiments, the active substance may be a sweetener. Delivery of the sweetener in combination with at least one taste potentiator may enhance the sweet taste upon consumption of the composition. In particular, the taste potentiator(s) may function synergistically with the sweetener to enhance the sweet taste. The incorporation of the potentiator(s), therefore, allows for reduced amounts of sweetener without compromising the level of sweetness provided by the composition. Due to the calories contained in many conventional sweeteners, such as sugar, these results may be highly desirable. Additionally, there may be significant cost savings associated with the reduction in sweetener amounts used in the composition.

For purposes of some embodiments described herein, "taste potentiator" refers to substances that may enhance the perception of an active substance during consumption of the composition. For purposes of some embodiments described herein, the term "enhance" means to intensify, supplement, modify, modulate or potentiate. Some taste potentiators may be referred to more specifically by reference to the type of active they enhance. For example, sweetener (or sweetness) potentiators enhance the perception of a sweetener during consumption and flavor potentiators enhance the perception of a flavor during consumption. These more specific examples, however, are merely subsets of taste potentiators and are encompassed by the general term "taste potentiator" as used herein.

Taste potentiators may have a synergistic effect when used in conjunction with an active, i.e., by enhancing the taste effects of the active substance such that the total effect is greater than the sum of the taste effects of the individual substances alone. In addition, some taste potentiators do not introduce a characteristic taste and/or aroma perception of their own.

In some embodiments, for instance, the taste potentiator(s) may enhance the sour, sweet, bitter, salty or umami taste of a composition. The taste potentiator(s) also may function to enhance the effects of a variety of other active substances, as discussed in more detail below.

Any of a variety of substances that function as taste potentiators may be employed in the compositions described herein. For instance, suitable taste potentiators include water-soluble taste potentiators, such as, but not limited to, neohesperidin dihydrochalcone, chlorogenic acid, alapyridaine, cynarin, miraculin, glupyridaine, pyridinium-betain compounds, glutamates, such as monosodium glutamate and monopotassium glutamate, neotame, thaumatin, tagatose, trehalose, salts, such as sodium chloride, monoammonium glycyrrhizinate, vanilla extract (in ethyl alcohol), water-soluble sugar acids, potassium chloride, sodium acid sulfate, water-soluble hydrolyzed vegetable proteins, water-soluble hydrolyzed animal proteins, water-soluble yeast extracts, adenosine monophosphate (AMP), glutathione, water-soluble nucleotides, such as inosine monophosphate, disodium inosinate, xanthosine monophosphate, guanylate monophosphate, alapyridaine (N-(1-carboxyethyl)-6-(hydroxymethyl)pyridinium-3-ol inner salt, sugar beet extract (alcoholic extract), sugarcane leaf essence (alcoholic extract), curculin, strogin, mabinlin, gymnemic acid, 2-hydroxybenzoic acid (2-HB), 3-hydroxybenzoic acid (3-HB), 4-hydroxybenzoic acid (4-HB), 2,3-dihydroxybenzoic acid (2,3-DHB), 2,4-dihydroxybenzoic acid (2,4-DHB), 2,5-dihydroxybenzoic acid (2,5-DHB), 2,6-dihydroxybenzoic acid (2,6-DHB), 3,4-dihydroxybenzoic acid (3,4-DHB), 3,5-dihydroxybenzoic acid (3,5-DHB), 2,3,4-trihydroxybenzoic acid (2,3,4-THB), 2,4,6-trihydroxybenzoic acid (2,4,6-THB), 3,4,5-trihydroxybenzoic acid (3,4,5-THB), 4-hydroxyphenylacetic acid, 2-hydroxyisocaproic acid, 3-hydroxycinnamic acid, 3-aminobenzoic acid, 4-aminobenzoic acid and combinations thereof.

Other suitable taste potentiators are substantially or completely insoluble in water, such as, but not limited to, citrus aurantium, vanilla oleoresin, water insoluble sugar acids, water insoluble hydrolyzed vegetable proteins, water insoluble hydrolyzed animal proteins, water insoluble yeast extracts, insoluble nucleotides, sugarcane leaf essence and combinations thereof.

Some other suitable taste potentiators include substances that are slightly soluble in water, such as, but not limited to, maltol, ethyl maltol, vanillin, slightly water-soluble sugar acids, slightly water-soluble hydrolyzed vegetable proteins, slightly water-soluble hydrolyzed animal proteins, slightly water-soluble yeast extracts, slightly water-soluble nucleotides and combinations thereof.

Additional suitable taste potentiators include, but are not limited to, licorice glycyrrhizinates, compounds that respond to G-protein coupled receptors (T2Rs and T1Rs), G-protein coupled receptors (T2Rs and T1Rs) and taste potentiator compositions that impart kokumi, as disclosed in U.S. Pat. No. 5,679,397 to Kuroda et al., which is incorporated in its entirety herein by reference. "Kokumi" refers to materials that impart "mouthfulness" and "good body". Kokumi imparting compositions may be water-soluble, slightly water-soluble or insoluble in water.

As mentioned above, sweetener potentiators, which are a type of taste potentiator, enhance the taste of sweetness. Exemplary sweetener potentiators include, but are not limited to, monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, sugar beet extract, neotame, thaumatin, neohesperidin dihydrochalcone, tagatose, trehalose, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs, 2-hydroxybenzoic acid (2-HB), 3-hydroxybenzoic acid (3-HB), 4-hydroxybenzoic acid (4-HB), 2,3-dihydroxybenzoic acid (2,3-DHB), 2,4-dihydroxybenzoic acid (2,4-DHB), 2,5-dihydroxybenzoic acid (2,5-DHB), 2,6-dihydroxybenzoic acid (2,6-DHB), 3,4-dihydroxybenzoic acid (3,4-DHB), 3,5-dihydroxybenzoic acid (3,5-DHB), 2,3,4-trihydroxybenzoic acid (2,3,4-THB), 2,4,6-trihydroxybenzoic acid (2,4,6-THB), 3,4,5-trihydroxybenzoic acid (3,4,5-THB), 4-hydroxyphenylacetic acid, 2-hydroxyisocaproic acid, 3-hydroxycinnamic acid, 3-aminobenzoic acid, 4-aminobenzoic acid and combinations thereof.

Additional taste potentiators for the enhancement of salt taste include acidic peptides, such as those disclosed in U.S. Pat. No. 6,974,597, herein incorporated by reference. Acidic peptides include peptides having a larger number of acidic amino acids, such as aspartic acid and glutamic acid, than basic amino acids, such as lysine, arginine and histidine. The acidic peptides are obtained by peptide synthesis or by subjecting proteins to hydrolysis using endopeptidase, and if necessary, to deamidation. Suitable proteins for use in the production of the acidic peptides or the peptides obtained by subjecting a protein to hydrolysis and deamidation include plant proteins, (e.g. wheat gluten, corn protein (e.g., zein and gluten meal), soybean protein isolate), animal proteins (e.g., milk proteins such as milk casein and milk whey protein, muscle proteins such as meat protein and fish meat protein, egg white protein and collagen), and microbial proteins (e.g., microbial cell protein and polypeptides produced by microorganisms).

The sensation of warming or cooling effects may also be prolonged with the use of a hydrophobic sweetener as described in U.S. Patent Publication No. 2003/0072842 A1, which is incorporated in its entirety herein by reference. For example, such hydrophobic sweeteners include those of the formulae I-XI as set forth below:

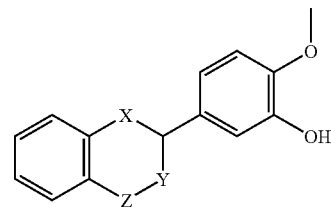

I wherein X, Y and Z are selected from the group consisting of $CH_2$, O and S;

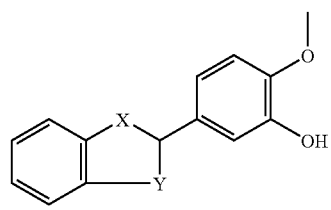

II wherein X and Y are selected from the group consisting of S and O;

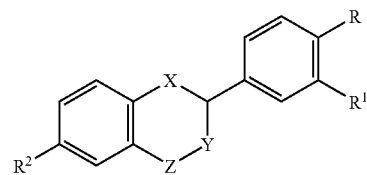

III wherein X is S or O; Y is O or $CH_2$; Z is $CH_2$, $SO_2$ or S; R is $OCH_3$, OH or H; $R^1$ is SH or OH and $R^2$ is H or OH;

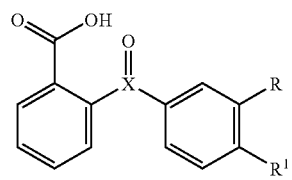

IV wherein X is C or S; R is OH or H and $R^1$ is $OCH_3$ or OH;

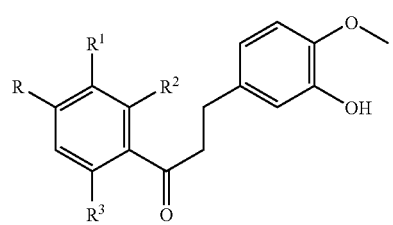

V wherein R, $R^2$ and $R^3$ are OH or H and $R^1$ is H or COOH;

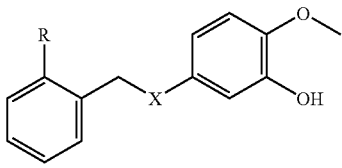

VI wherein X is O or $CH_2$ and R is COOH or H;

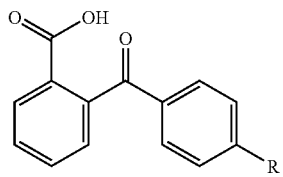

VII wherein R is $CH_3CH_2$, OH, $N(CH3)_2$ or Cl;

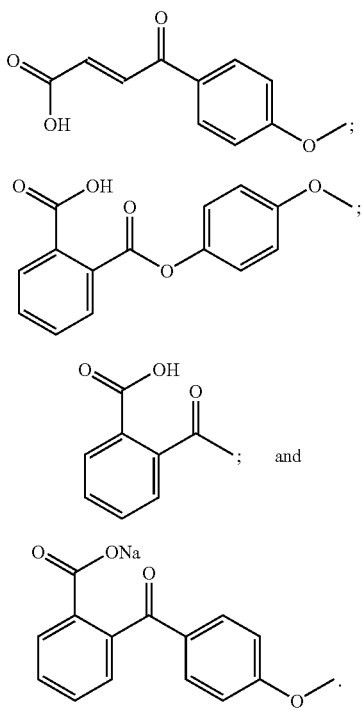

VIII

IX

X and

XI

Perillartine also may be added as described in U.S. Pat. No. 6,159,509, which is incorporated in its entirety herein by reference.

Any of the above-listed taste potentiators may be used alone or in combination.

Some embodiments, for instance, may include two or more taste potentiators that act synergistically with one another. For instance, in some embodiments, a sweetener potentiator composition may be provided, which includes two or more sweetener potentiators that act synergistically with one another. The sweetener potentiator composition may enhance the sweetness of products into which it is incorporated by reducing the amount of sucrose needed to provide a sweetness intensity equivalent to sucrose. The sweetness enhancing effect of the combination of sweetener potentiators may be greater than the effect of either compound used individually.

More specifically, according to some embodiments, there is provided a sweetener potentiator composition comprising 3-hydroxybenzoic acid (3-HB) and 2,4-dihydroxybenzoic acid (2,4-DHB) or comestible salts thereof.

Comestible salts include acid (i.e. carboxylate) salts and/or hydroxylate salts, especially sodium, potassium, calcium, magnesium, and ammonium salts and the like. Desirably, in some embodiments, the sweetener potentiator composition employs 3-HB and/or 2,4-DHB in the form of the acid, the sodium salt or the potassium salt.

Although 3-HB and 2,4-DHB have been studied individually, they have not been used in combination. The inventors have discovered that a surprisingly large sweetness enhancing effect is observed when both compounds are employed in combination with a sweetener. This effect is greater than would be predicted by the use of either compound individually.

In particular, in some embodiments, sufficient amounts of 3-HB and 2,4-DHB are employed in the sweetener potentiator compositions to create a sucrose equivalent value of at least about seven %, more specifically, at least about eight %.

3-HB and 2,4-DHB may be used in combination with a variety of different sweeteners to enhance the sweetness thereof, including bulk and intense sweeteners. For example, 3-HB and 2,4-DHB may be used in combination with sucrose (5% solution) to provide a sucrose equivalent value of at least about eight %. In some embodiments, 3-HB and 2,4-DHB may be used in combination with any of the following bulk sweeteners to provide a sucrose equivalent value of at least about seven %: sucrose; fructose; tagatose; maltitol; and glucose.

In some embodiments, 3-HB and 2,4-DHB may be used in combination with intense sweeteners to obtain a sucrose equivalent value of at least about seven %, such as, aspartame, acesulfame-K, aspartame in combination with acesulfame-K, sucralose and sucralose in combination with acesulfame-K. Even more specifically, in some embodiments, 3-HB and 2,4-DHB may be used with the following intense sweeteners to provide a sucrose equivalent value of at least about eight %: aspartame in combination with acesulfame-K; sucralose; and sucralose in combination with acesulfame-K.

In general, 3-HB and 2,4-DHB may be used in amounts of about 200 ppm, 400 ppm or 500 ppm. 3-HB and 2,4-DHB may be incorporated into sweetener potentiator compositions in equal or different amounts.

In some embodiments, the sweetener potentiator composition contains 3-HB and 2,4-DHB in a ratio by weight of from 1:9 to 9:1, more specifically from 2:8 to 8:2, even more specifically from 4:6 to 6:4 and most specifically 1:1.

The sweetener potentiator composition may contain a further sweetener potentiator. For instance, 3,4-dihydroxybenzoic acid (3,4-DHB) or its comestible salt may be employed.

In some embodiments, the sweetener potentiator composition may be provided as a pre-blended powder or liquid, which may be added to another composition, whereas in other embodiments, the individual components of the sweetener potentiator composition may be added to another composition as individual ingredients.

In some embodiments, it may be desirable to control the release rate of the taste potentiator(s) from the compositions, as well as the overall release profile of the compositions themselves. Different release rates may be desired depending on the type of final product in which the composition is being incorporated and the consumption time thereof.

In some embodiments, the release rate may be based on the solubility of the taste potentiator(s) in water. Selection of a specific solubility may be used to control the release profile of the taste potentiator(s), as well as the overall composition. More specifically, taste potentiators have varying solubilities in water. Although some of these components are water-soluble, i.e., capable of being substantially or completely dissolvable in water, others exhibit poor or no solubility in water. In some embodiments, for instance, it may be desirable to select one or more taste potentiators that have low water-solubility in combination with an active known to exhibit poor solubility in water. The highly insoluble taste potentiator thereby may last throughout consumption of the composition as the active substance also slowly releases therefrom. Alternatively, a relatively highly water-soluble potentiator may be paired with a relatively highly water-soluble active substance. In both of these instances, the taste potentiator and active substance may be selected based on solubilities such that their release profiles are similar or overlap.

In other embodiments, for example, it may be desirable to select several taste potentiators that have different solubilities in water such that the potentiators may release sequentially from the composition. Another example may include multiple sequentially releasing taste potentiators with multiple active substances also having different solubilities in water. Numerous other combinations of taste potentiators having different solubilities also may be used to provide different release profiles for the compositions. In view thereof, the solubility of the taste potentiator(s), as well as the combination thereof with the active(s), may be used to control and tailor the release profile of the overall composition.

For purposes of some embodiments described herein, therefore, the term "controlled-release" means that the duration or manner of release is managed or modified to some degree to provide a desired release profile. More specifically, for example, controlled-release includes at least the following release profiles: delayed onset of release; pulsed release; gradual release; high initial release; sustained release; sequential release; and combinations thereof.

Taste potentiators and active substances having different solubilities and/or release profiles may be combined in numerous different embodiments to provide compositions having many different overall release profiles. For example, one or more taste potentiators having any of the following release profiles may be combined in any manner with one or more active substances having any of the following release profiles: delayed onset of release ("DOR"); pulsed release ("PR"); gradual release ("GR"); high initial release ("HIR"); and sustained release ("SUR"). Moreover, other techniques of imparting these, as well as other controlled-release profiles to taste potentiators and/or active substances may be employed. For instance, encapsulation techniques, which are discussed in more detail below, may be used. Additionally, taste potentiator(s) and active substance(s) that are not encapsulated (sometimes referred to as "free" components) may be combined with other forms of the components, such as encapsulated forms, to tailor the release profile of the potentiator compositions. A sampling of hypothetical combinations is provided in Table 1 below, wherein $P_1$-$P_3$ represent different taste potentiators and $A_1$-$A_3$ represent different active substances. $P_1$-$P_3$ and $A_1$-$A_3$ may be used in their free and/or encapsulated forms.

TABLE 1

| Hypothetical Combinations | $P_1$ | $P_2$ | $P_3$ | $A_1$ | $A_2$ | $A_3$ |
|---|---|---|---|---|---|---|
| 1 | GR | HIR | | GR | HIR | |
| 2 | | GR | HIR | | GR | HIR |
| 3 | PR | SUR | GR | PR | SUR | GR |
| 4 | | PR | SUR | | PR | SUR |
| 5 | HI | | PR | HI | | PR |
| 6 | DOR | HIR | | DOR | HIR | |
| 7 | | DOR | HIR | | DOR | HIR |
| 8 | | | DOR | PR | | DOR |
| 9 | SUR | HIR | | | PR | |
| 10 | | SUR | HIR | | | PR |

Controlled-release properties also may be imparted to the compositions described herein in other manners, such as, for example, by encapsulation techniques, as mentioned above. Encapsulation may be used to impart any of the various release profiles discussed above. In some embodiments, the taste potentiator(s) and/or active substance(s) may be encapsulated to control the rate of release of the potentiator and/or active from the composition. For example, in some embodiments, 3-HB and/or 2,4-DHB may be used in their encapsulated forms.

For instance, some embodiments may include at least one encapsulated taste potentiator and at least one unencapsulated active, i.e., in its free form. Other embodiments may include at least one unencapsulated taste potentiator and at least one encapsulated active substance. Further, in some embodiments, both the taste potentiator(s) and active substance(s) may be encapsulated. In such embodiments, the taste potentiator(s) and active substance(s) may be encapsulated together or separately. In embodiments in which the taste potentiator(s) and active substance(s) are encapsulated separately, the material used to encapsulate the components may be the same or different. Furthermore, in any of these embodiments, more than one material may be used to encapsulate the taste potentiator(s) or the active substance(s).

In any of the embodiments mentioned above, the encapsulated form of the taste potentiator(s) or active substance(s) may be used in combination with an amount of the same component in its free, i.e., unencapsulated, form. By using both the free component and the encapsulated component, the enhanced perception of the active may be provided over a longer period of time and/or perception of the active by a consumer may be improved. For instance, some embodiments may include a taste potentiator that is encapsulated in combination with an amount of the same taste potentiator in its unencapsulated form. Alternatively, the unencapsulated taste potentiator could be a different taste potentiator from the potentiator that is encapsulated. Thereby, a mixture of two different taste potentiators may be included in some embodiments, one of which is encapsulated and the other in its free form. These variations also may be employed with respect to the active substance(s).

Encapsulation may be effected by dispersion of the components, spray drying, spray coating, fluidized bed drying, absorption, adsorption, coacervation, complexation, or any other standard technique. In general, the taste potentiator(s) and/or active substances(s) may be encapsulated by an encapsulant. For purposes of some embodiments described herein, the term "encapsulant" refers to a material that can fully or partially coat or enrobe another substance. Encapsulation is also meant to include adsorption of a substance onto another substance and the formation of agglomerates or conglomerates between two substances.

Any material conventionally used as an encapsulant in edible products may be employed. In some embodiments, for instance, it may be desirable to use an encapsulant that delays the release of the taste potentiator(s), such as, for example, a hydrophobic encapsulant. In contrast, in other embodiments, it may be desirable to increase the rate of release by using an encapsulant such as, for example, a hydrophilic material. Moreover, more than one encapsulant may be used. For example, a taste potentiator or an active substance may be encapsulated by a mixture of two or more encapsulants to tailor the rate of release.

It is believed that taste potentiators can act in conjunction with active substances to enhance their activity. In some embodiments, therefore, it may be desirable to control the release of the potentiator(s) such that it substantially coincides with that of the active substance(s) included in the composition. As discussed above, some taste potentiators have rapid release rates, whereas other taste potentiators have slower release rates. Meanwhile, some active substances have rapid release rates, whereas others have slower release rates. In some embodiments, the material used to encapsulate the taste potentiator(s) may be selected to delay or increase the release rate of the potentiator(s) based on the release profiles of both the potentiator(s) and active substance(s) selected for use together in the composition.

More specifically, in some embodiments, the active substance(s) contained in the composition may have a slower release profile than the taste potentiator(s) selected for use in the same composition. It may be desirable, therefore, to delay the release of the taste potentiator(s) from the composition such that it releases substantially in conjunction with the active(s). The corresponding release profile may increase the effectiveness of the taste potentiator(s) in enhancing the perception of the active(s) throughout consumption.

Suitable encapsulants for use in delayed release embodiments include, but are not limited to, polyvinyl acetate, polyethylene, crosslinked polyvinyl pyrrolidone, polymethylmethacrylate, polylactide acid, polyhydroxyalkanoates, ethylcellulose, polyvinyl acetatephthalate, methacrylic acid-co-methylmethacrylate and combinations thereof.

In some embodiments, as mentioned above, the taste potentiator(s) may be water-soluble. For example, the following taste potentiators are water-soluble: neohesperidin dihydrochalcone, chlorogenic acid, alapyridaine, cynarin, miraculin, glupyridaine, pyridinium-betain compounds, glutamates, such as monosodium glutamate and monopotassium glutamate, neotame, thaumatin, tagatose, trehalose, salts, such as sodium chloride, monoammonium glycyrrhizinate, vanilla extract (in ethyl alcohol), water-soluble sugar acids, potassium chloride, sodium acid sulfate, water-soluble hydrolyzed vegetable proteins, water-soluble hydrolyzed animal proteins, water-soluble yeast extracts, adenosine monophosphate (AMP), glutathione, water-soluble nucleotides, such as inosine monophosphate, disodium inosinate, xanthosine monophosphate, guanylate monophosphate, alapyridaine (N-(1-carboxyethyl)-6-(hydroxymethyl)pyridinium-3-ol inner salt, sugar beet extract (alcoholic extract), sugarcane leaf essence (alcoholic extract), curculin, strogin, mabinlin, gymnemic acid, 2-hydroxybenzoic acid (2-HB), 3-hydroxybenzoic acid (3-HB), 4-hydroxybenzoic acid (4-HB), 2,3-dihydroxybenzoic acid (2,3-DHB), 2,4-dihydroxybenzoic acid (2,4-DHB), 2,5-dihydroxybenzoic acid (2,5-DHB), 2,6-dihydroxybenzoic acid (2,6-DHB), 3,4-dihydroxybenzoic acid (3,4-DHB), 3,5-dihydroxybenzoic acid (3,5-DHB), 2,3,4-trihydroxybenzoic acid (2,3,4-THB), 2,4, 6-trihydroxybenzoic acid (2,4,6-THB), 3,4,5-trihydroxybenzoic acid (3,4,5-THB), 4-hydroxyphenylacetic acid, 2-hydroxyisocaproic acid, 3-hydroxycinnamic acid, 3-aminobenzoic acid, 4-aminobenzoic acid and combinations thereof. Due to their water-solubility, such taste potentiators may tend to release rapidly from the compositions into which they are incorporated. As such, in some embodiments, water-soluble taste potentiators may be encapsulated by an encapsulant that delays the release of the potentiator(s), as provided above.

In other embodiments, it may be desirable to increase the release of the taste potentiator(s) from the composition. For instance, the taste potentiator(s) included in the composition may have a slower release rate than the active substance(s) selected for use in combination therewith. This difference in release rates may reduce the effectiveness of the taste potentiator(s). Accordingly, such taste potentiators may be encapsulated with an encapsulant that increases the rate of the potentiator's release. Thereby, the release of the potentiator(s) and the active(s) may substantially coincide during consumption.

Suitable encapsulants for use in increased release embodiments include, but are not limited to, cyclodextrins, sugar alcohols, starch, gum arabic, polyvinylalcohol, polyacrylic acid, gelatin, guar gum, fructose and combinations thereof.

In some embodiments, as mentioned above, the taste potentiator(s) may be substantially or completely insoluble in water. For example, the following taste potentiators are substantially or completely water-insoluble: citrus aurantium, vanilla oleoresin, water insoluble sugar acids, water insoluble hydrolyzed vegetable proteins, water insoluble hydrolyzed animal proteins, water insoluble yeast extracts, insoluble nucleotides, sugarcane leaf essence and combinations thereof. Due to their poor solubility in water, such taste potentiators may tend to release slowly from the compositions. As such, in some embodiments, substantially or completely water-insoluble taste potentiators may be encapsulated by an encapsulant that increases the release of the potentiator(s), as provided above.

In accordance with the above, the encapsulated taste potentiator may include a taste potentiator and an encapsulant. The encapsulant may be selected based upon the desired release profile of the taste potentiator. In some embodiments, the taste potentiator(s) may be present in amounts of about 0.01% to about 10% by weight of the composition, more specifically about 0.1% to about 2% by weight of the composition.

In some embodiments, the encapsulant may be present in amounts of about 1% to about 95% by weight of the composition, more specifically about 5% to about 30% by weight of the composition.

In some embodiments, the encapsulated substance, i.e. encapsulated taste potentiator(s) or active(s), may have a high tensile strength, such as at least about 6,500 psi. More specifically, the tensile strength may be about 6,500 psi to about 200,000 psi. Such tensile strengths may be suitable for controlling the release of the taste potentiator(s) and/or active substance(s) in a consistent manner over an extended period of time. Tensile strengths of encapsulated substances are described in more detail in U.S. Patent Publication No. 2005/0112236 A1, the contents of which are incorporated by reference herein.

In some embodiments, the active substance(s) included in the potentiator compositions may be present in amounts of about 1% to about 95% by weight of the composition, more specifically about 5% to about 30% by weight of the composition.

The active substance(s) may be any component for which the perception is enhanced in some manner by the presence of one or more taste potentiators. Suitable active substances include, but are not limited to, compounds that provide flavor, sweetness, tartness, umami, kokumi, savory, saltiness, cooling, warmth or tingling. Other suitable actives include oral care agents, nutraceutical actives and pharmaceutical actives. Combinations of active substances also may be employed.

Compounds that provide flavor (flavorings or flavor agents), which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, yazu, sudachi, and fruit essences including apple, pear, peach, grape, blueberry, strawberry, raspberry, cherry, plum, pineapple, watermelon, apricot, banana, melon, apricot, ume, cherry, raspberry, blackberry, tropical fruit, mango, mangosteen, pomegranate, papaya and so forth. Other potential flavors include a milk flavor, a butter flavor, a cheese flavor, a cream flavor, and a yogurt flavor; a vanilla flavor; tea or coffee flavors, such as a green tea flavor, a oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a sassafras flavor, a savory flavor, a *Zanthoxyli Fructus* flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor. These flavoring agents may be used in liquid or solid form and may be used individually or in admixture. Commonly used flavors include mints such as peppermint, menthol, spearmint, artificial vanilla, cinnamon derivatives, and various fruit flavors, whether employed individually or in admixture. Flavors may also provide breath freshening properties, particularly the mint flavors when used in combination with cooling agents.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63-258, by the National Academy of Sciences, may be used. This publication is incorporated herein by reference.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, and mixtures thereof.

In some embodiments, the flavor agent may be employed in either liquid form and/or dried form. When employed in the latter form, suitable drying means such as spray drying the oil may be used. Alternatively, the flavor agent may be absorbed onto water soluble materials, such as cellulose, starch, sugar, maltodextrin, gum arabic and so forth or may be encapsulated. The actual techniques for preparing such dried forms are well-known.

In some embodiments, the flavor agents may be used in many distinct physical forms well-known in the art to provide an initial burst of flavor and/or a prolonged sensation of flavor. Without being limited thereto, such physical forms include free forms, such as spray dried, powdered, beaded forms, encapsulated forms, and mixtures thereof.

Compounds that provide sweetness (sweeteners or sweetening agents) may include bulk sweeteners such as sugars, sugarless bulk sweeteners, or the like, or mixtures thereof.

Suitable sugar sweeteners generally include mono-saccharides, di-saccharides and poly-saccharides such as but not limited to, sucrose (sugar), dextrose, maltose, dextrin, xylose, ribose, glucose, lactose, mannose, galactose, fructose (levulose), invert sugar, fructo oligo saccharide syrups, partially hydrolyzed starch, corn syrup solids and mixtures thereof Suitable sugarless bulk sweeteners include sugar alcohols (or polyols) such as, but not limited to, sorbitol, xylitol, mannitol, galactitol, maltitol, hydrogenated isomaltulose (ISOMALT), lactitol, erythritol, hydrogenated starch hydrolysate, stevia and mixtures thereof.

Suitable hydrogenated starch hydrolysates include those disclosed in U.S. Pat. No. 4,279,931 and various hydrogenated glucose syrups and/or powders which contain sorbitol, maltitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN®, a commercially available product manufactured by Roquette Freres of France, and HYSTAR®, a commercially available product manufactured by SPI Polyols, Inc. of New Castle, Del., are also useful.

In some embodiments, high-intensity sweeteners may be used. Without being limited to particular sweeteners, representative categories and examples include:

(a) water-soluble sweetening agents such as dihydrochalcones, monellin, stevia, steviosides, rebaudioside A, glycyrrhizin, dihydroflavenol, and sugar alcohols such as sorbitol, mannitol, maltitol, xylitol, erythritol and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro- 6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and mixtures thereof;

(c) dipeptide based sweeteners, such as L-aspartic acid derived sweeteners, such as L-aspartyl-L-phenylalanine methyl ester (Aspartame) and materials described in U.S. Pat. No. 3,492,131, L-alphaaspartyl-N-(2,2,4,4-tetramethyl-3-thietanyl)-D-alaninamide hydrate (Alitame), N—[N-(3,3-dimethylbutyl)-L-aspartyl]-L-phenylalanine 1-methyl ester (Neotame), methyl esters of L-aspartyl-L-phenylglycerine and L-aspartyl-L-2,5-dihydrophenyl-glycine, L-aspartyl-2, 5-dihydro-L-phenylalanine; L-aspartyl-L-(1-cyclohexen)-alanine, and mixtures thereof;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructo furanoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1',6'-dichloro 1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalacto-sucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro4,6,1',6'-tetradeoxygalacto-sucrose; and 4,6,1',6'-tetradeoxy-sucrose, and mixtures thereof;

(e) protein based sweeteners such as thaumaoccous danielli (Thaumatin I and II) and talin;

(f) the sweetener monatin (2-hydroxy-2-(indol-3-ylmethyl)-4-aminoglutaric acid) and its derivatives; and (g) the sweetener Lo han guo (sometimes also referred to as "Lo han kuo").

The intense sweetening agents may be used in many distinct physical forms well-known in the art to provide an initial burst of sweetness and/or a prolonged sensation of sweetness. Without being limited thereto, such physical forms include free forms, such as spray dried, powdered, beaded forms, encapsulated forms, and mixtures thereof.

Compounds that provide tartness may include acidulants, such as acetic acid, adipic acid, ascorbic acid, butyric acid, citric acid, formic acid, fumaric acid, glyconic acid, lactic acid, phosphoric acid, malic acid, oxalic acid, succinic acid, tartaric acid and mixtures thereof.

Compounds that provide umami or savory flavor may include monosodium glutamate (MSG), glutamic acid, glutamates, aspartate, free amino acids, IMP (disodium 5'-inosine monophosphate) and GMP (disodium 5'-guanosine monophosphate), compounds that stimulate T1R1 and T1R3 receptors, mushroom flavor, fermented fish flavor, and muscle flavors, such as beef, chicken, pork, ostrich, venison and buffalo.

Substances that impart kokumi may include a mixture selected from: (1) gelatin and tropomyosin and/or tropomyosin peptides; (2) gelatin and paramyosin; and (3) troponin and tropomyosin and/or tropomyosin peptides, as disclosed in U.S. Pat. No. 5,679,397 to Kuroda et al., referred to above.

Compounds that provide saltiness may include conventional salts, such as sodium chloride, calcium chloride, potassium chloride, 1-lysine and combinations thereof.

Compounds that provide a cooling sensation may include physiological cooling agents. A variety of well known cooling agents may be employed. For example, among the useful cooling agents are included xylitol, erythritol, dextrose, sorbitol, menthane, menthone, ketals, menthone ketals, menthone glycerol ketals, substituted p-menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p-menthane, 2-mercapto-cyclo-decanone, hydroxycarboxylic acids with 2-6 carbon atoms, cyclohexanamides, menthyl acetate, menthyl salicylate, N,2,3-trimethyl-2-isopropyl butanamide (WS-23), N-ethyl-p-menthane-3-carboxamide (WS-3), isopulegol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methyl-cyclohexanecarboxamide, Japanese mint oil, peppermint oil, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienanide, N,N-dimethyl menthyl succinamide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, Eucalyptus extract (p-Mehtha-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopropyl-bicyclo (2.2.1), Heptane-2-carboxamide; and Menthol methyl ether, and menthyl pyrrolidone carboxylate among others. These and other suitable cooling agents are further described in the following U.S. patents, all of which are incorporated in their entirety by reference hereto: U.S. Pat. Nos. 4,230,688; 4,032, 661; 4,459,425; 4,136,163; 5,266,592; 6,627,233.

Compounds that provide warmth (warming agents) may be selected from a wide variety of compounds known to provide the sensory signal of warming to the individual user. These compounds offer the perceived sensation of warmth, particularly in the oral cavity, and often enhance the perception of flavors, sweeteners and other organoleptic components. Useful warming agents include those having at least one allyl vinyl component, which may bind to oral receptors. Examples of suitable warming agents include, but are not limited to: vanillyl alcohol n-butylether (TK-1000, supplied by Takasago Perfumery Company Ltd., Tokyo, Japan); vanillyl alcohol n-propylether; vanillyl alcohol isopropylether; vanillyl alcohol isobutylether; vanillyl alcohol n-aminoether; vanillyl alcohol isoamylether; vanillyl alcohol n-hexylether; vanillyl alcohol methylether; vanillyl alcohol ethylether; gingerol; shogaol; paradol; zingerone; capsaicin; dihydrocapsaicin; nordihydrocapsaicin; homocapsaicin; homodihydrocapsaicin; ethanol; isopropyl alcohol; iso-amylalcohol; benzyl alcohol; glycerine; chloroform; eugenol; cinnamon oil; cinnamic aldehyde; phosphate derivatives thereof; and combinations thereof.

Compounds that provide a tingling sensation also are known and referred to as "tingling agents." Tingling agents may be employed to provide a tingling, stinging or numbing sensation to the user. Tingling agents include, but are not limited to: Jambu Oleoresin or para cress (*Spilanthes* sp.), in which the active ingredient is Spilanthol; Japanese pepper extract (*Zanthoxylum peperitum*), including the ingredients known as Saanshool-I, Saanshool-II and Sanshoamide; black pepper extract (*piper nigrum*), including the active ingredients chavicine and piperine; Echinacea extract; Northern Prickly Ash extract; and red pepper oleoresin. In some embodiments, alkylamides extracted from materials such as jambu or sanshool may be included. Additionally, in some embodiments, a sensation is created due to effervescence. Such effervescence is created by combining an alkaline material with an acidic material, either or both of which may be encapsulated. In some embodiments, an alkaline material may include alkali metal carbonates, alkali metal bicarbonates, alkaline earth metal carbonates, alkaline earth metal bicarbonates and mixtures thereof. In some embodiments, an acidic material may include acetic acid, adipic acid, ascorbic acid, butyric acid, citric acid, formic acid, fumaric acid, glyconic acid, lactic acid, phosphoric acid, malic acid, oxalic acid, succinic acid, tartaric acid and combinations thereof. Examples of "tingling" type sensates can be found in U.S. Pat. No. 6,780,443, the entire contents of which are incorporated herein by reference for all purposes. Tingling agents are described in U.S. Pat. No. 6,780,443 to Nakatsu et al., U.S. Pat. No. 5,407,665 to McLaughlin et al., U.S. Pat. No. 6,159,509 to Johnson et al. and U.S. Pat. No. 5,545,424 to Nakatsu et al., each of which is incorporated by reference herein in its entirety.

Oral care agents that may be used include those actives known to the skilled artisan, such as, but not limited to, surfactants, breath freshening agents, anti-microbial agents, antibacterial agents, anti-calculus agents, anti-plaque agents, oral malodor control agents, fluoride compounds, quaternary ammonium compounds, remineralization agents and combinations thereof.

Suitable surfactants include, but are not limited to, salts of fatty acids selected from the group consisting of $C_8$-$C_{24}$, palmitoleic acid, oleic acid, eleosteric acid, butyric acid, caproic acid, caprylic acid, capric acid, lauric acid, myristic acid, palmitic acid, stearic acid, ricinoleic acid, arachidic acid, behenic acid, lignoceric acid, cerotic acid, sulfated butyl oleate, medium and long chain fatty acid esters, sodium oleate, salts of fumaric acid, potassium glomate, organic acid esters of mono- and diglycerides, stearyl monoglyceridyl citrate, succistearin, dioctyl sodium sulfosuccinate, glycerol tristearate, lecithin, hydroxylated lecithin, sodium lauryl sulfate, acetylated monoglycerides, succinylated monoglycerides, monoglyceride citrate, ethoxylated mono- and diglycerides, sorbitan monostearate, calcium stearyl-2-lactylate, sodium stearyl lactylate, lactylated fatty acid esters of glycerol and propylene glycol, glycerol-lactoesters of $C_8$-$C_{24}$ fatty acids, polyglycerol esters of $C_8$-$C_{24}$ fatty acids, propylene glycol alginate, sucrose $C_8$-$C_{24}$ fatty acid esters, diacetyl tartaric and citric acid esters of mono- and diglycerides, triacetin, sarcosinate surfactants, isethionate surfactants, tautate surfactants, pluronics, polyethylene oxide condensates of alkyl phenols, products derived from the condensation of ethylene oxide with the reaction product of propylene oxide and ethylene diamine, ethylene oxide condensates of aliphatic alcohols, long chain tertiary amine oxides, long chain tertiary phosphine oxides, long chain dialkyl sulfoxides, and combinations thereof.

Suitable antibacterial agents include, but are not limited to, chlorhexidine, alexidine, quaternary ammonium salts, benzethonium chloride, cetyl pyridinium chloride, 2,4,4'-trichloro-2'-hydroxy-diphenyl ether (triclosan) and combinations thereof.

Suitable fluoride compounds include, but are not limited to, sodium fluoride, sodium monofluorophosphate, stannous fluoride and combinations thereof.

Suitable anti-calculus agents include, but are not limited to, pyrophosphates, triphosphates, polyphosphates, polyphosphonates, dialkali metal pyrophosphate salt, tetra alkali polyphosphate salt, tetrasodium pyrophosphate, tetrapotassium pyrophosphate, sodium tripolyphosphate and combinations thereof.

Suitable anti-microbial agents include, but are not limited to, cetylpyridinium chloride, zinc compounds, copper compounds and combinations thereof.

Suitable remineralization agents include, but are not limited to casein phosphopeptide-amorphous calcium phosphate, casein phosphoprotein-calcium phosphate complex, casein phosphopeptide-stabilized calcium phosphate, and combinations thereof.

Other oral care actives known to those skilled in the art are considered well within the scope of the present invention.

Pharmaceutical actives include drugs or medicaments, breath fresheners, vitamins and other dietary supplements, minerals, caffeine, nicotine, fruit juices, and the like, and mixtures thereof. Examples of useful drugs include ace-inhibitors, antianginal drugs, anti-arrhythmias, anti-asthmatics, anti-cholesterolemics, analgesics, anesthetics, anti-convulsants, anti-depressants, anti-diabetic agents, anti-diarrhea preparations, antidotes, anti-histamines, anti-hypertensive drugs, anti-inflammatory agents, anti-lipid agents, anti-manics, anti-nauseants, anti-stroke agents, anti-thyroid preparations, anti-tumor drugs, anti-viral agents, acne drugs, alkaloids, amino acid preparations, anti-tussives, anti-uricemic drugs, anti-viral drugs, anabolic preparations, systemic and non-systemic anti-infective agents, anti-neoplastics, anti-parkinsonian agents, anti-rheumatic agents, appetite stimulants, biological response modifiers, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies such as sildenafil citrate, which is currently marketed as Viagra®, fertility agents, gastrointestinal agents, homeopathic remedies, hormones, hypercalcemia and hypocalcemia management agents, immunomodulators, immunosuppressives, migraine preparations, motion sickness treatments, muscle relaxants, obesity management agents, osteoporosis preparations, oxytocics, parasympatholytics, parasympathomimetics, prostaglandins, psychotherapeutic agents, respiratory agents, sedatives, smoking cessation aids such as bromocryptine or nicotine, sympatholytics, tremor preparations, urinary tract agents, vasodilators, laxatives, antacids, ion exchange resins, anti-pyretics, appetite suppressants, expectorants, anti-anxiety agents, anti-ulcer agents, anti-inflammatory substances, coronary dilators, cerebral dilators, peripheral vasodilators, psycho-tropics, stimulants, anti-hypertensive drugs, vasoconstrictors, migraine treatments, antibiotics, tranquilizers, anti-psychotics, anti-tumor drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spasmodics, terine relaxants, anti-obesity drugs, erythropoietic drugs, anti-asthmatics, cough suppressants, mucolytics, DNA and genetic modifying drugs, and combinations thereof.

In some embodiments, a mixture of at least one active substance and at least one taste potentiator is encapsulated, rather than encapsulating the taste potentiator or the active substance alone. Similar to above, the encapsulant may be selected to delay or increase the rate of release of the mixture of components. Any of the encapsulants described above may be employed.

For example, in some embodiments, the active substance(s) may be at least one intense sweetener. The intense sweetener(s) may be mixed with at least one taste potentiator, which is selected to increase the sweet taste of the intense sweetener(s). This mixture of components may then be encapsulated. Examples of suitable intense sweeteners include, but are not limited to, neotame, aspartame, Acesulfame-K, sucralose, saccharin and combinations thereof.

In embodiments including an encapsulated mixture of active(s) and potentiator(s), the active substance(s) may be present in amounts of about 1% to about 95% by weight of the composition, more specifically about 5% to about 30% by weight. The taste potentiator(s) may be present in amounts of about 0.01% to about 12% by weight of the composition, more specifically about 0.1% to about 5% by weight. The encapsulant may be present in amounts of about 1% to about 95% by weight of the composition, more specifically about 10% to about 60% by weight.

As mentioned above, some embodiments may include a mixture of at least one encapsulated taste potentiator and at least one taste potentiator in its free form. The encapsulated and unencapsulated taste potentiators may be the same or different. The encapsulated taste potentiator(s) may be encapsulated by any of the materials described above. The mixture of encapsulated and unencapsulated taste potentiators may be combined with one or more active substances to provide a potentiator composition.

Some other embodiments provide compositions that modulate the activity of taste receptor cells in a mammal. Such compositions may include at least one active substance and at least one taste potentiator, as described above. These components may be encapsulated or unencapsulated, also as described above. The taste potentiator(s) may modulate the activity of taste receptor cells upon consumption of the composition. More specifically, taste is perceived through sensory cells located in the taste buds. Different signaling mechanisms sense the primary tastes of salty, sour, sweet, bitter and umami. Eventually a nerve impulse is triggered in the brain that is sensed as one of these primary tastes.

Taste potentiators function by modulating the activity of taste receptor cells at some point in this taste signaling pathway. For instance, in some cases, taste potentiators may bind to taste receptors, such as, for example, sweet taste receptors, which thereby enhances the perception of the sweet taste. In other embodiments, for example, taste potentiators may block taste receptors, such as, for example bitter receptors, which suppresses the perception of a bitter taste and thereby enhances the perception of a sweet taste. Taste potentiator(s), therefore, modulate the activity of taste receptor cells in mammals, which thereby enhances the perception of a given taste. This activity may enhance the perception of an active substance contained in the composition when consumed in conjunction with a taste potentiator.

Beverage Compositions

In some embodiments, the potentiator compositions may reside in a beverage composition including at least one active substance and at least one taste potentiator. Beverages suitable for use herein include, for example, soft or carbonated drinks, juice-based drinks, milk-based drinks, beverages made from brewed components such as teas and coffees, beverage mixes, beverage concentrates, powdered beverages, beverage syrups, frozen beverages, gel beverages, alcoholic beverages, and the like.

The beverages may include any of the potentiator compositions described herein. In general, the potentiator compositions are present in the beverage compositions in amounts of about 0.001% to about 0.100%, more specifically about 0.02% to about 0.08%, and even more specifically about 0.04% to about 0.06% by weight of the beverage composition.

In some embodiments, the potentiator composition incorporated into the beverage composition may be a sweetener potentiator composition including 3-HB and/or 2,4-DHB. As mentioned above, 3-HB and 2,4-DHB act synergistically with one another to enhance the sweetness of beverages into which the potentiators are incorporated.

The concentration of 3-HB, as calculated in the form of the free acid, generally may be up to 1500 ppm in the beverage product, more specifically in the range from 100 to 1500 ppm, even more specifically in the range from 200 to 1000 ppm, yet more specifically in the range from 300 to 800 ppm and most specifically in the range from 400 to 600 ppm.

The concentration of 2,4-DHB, as calculated in the form of the free acid, generally may be up to 1500 ppm in the beverage product, more specifically in the range from 100 to 1500 ppm, even more specifically in the range from 200 to 1000 ppm, yet more specifically in the range from 300 to 800 ppm and most specifically in the range from 400 to 600 ppm.

In general, the combined concentration of 3-HB and 2,4-DHB may be no more than 1500 ppm.

Of course, the required concentrations will depend upon the nature of the beverage to be sweetened, the level of sweetness required, the nature of the sweetener(s) in the product and the degree of enhancement required.

In some embodiments, some or all of the active and/or the taste potentiator may be employed in a free form (e.g., unencapsulated). Alternatively, the beverage composition may include some or all of the active and/or the taste potentiator in an encapsulated form. As a further alternative, the beverage composition may include some of the active and/or the taste potentiator in a free form and some of the active and/or the taste potentiator in an encapsulated form. In some embodiments, the beverage composition may include two or more potentiator compositions.

Juice-Based Compositions

Juice-based compositions generally contain a juice component obtained from fruit or vegetable. The juice component can be used in any form such as a juice form, a concentrate, an extract, a powder, or the like.

Suitable juices include, for example, citrus juice, non-citrus juice, or mixtures thereof, which are known for use in beverages. Examples of such juices include, non-citrus juices such as apple juice, grape juice, pear juice, nectarine juice, currant juice, raspberry juice, gooseberry juice, blackberry juice, blueberry juice, strawberry juice, custard-apple juice, pomegranate juice, guava juice, kiwi juice, mango juice, papaya juice, watermelon juice, cantaloupe juice, cherry juice, cranberry juice, peach juice, apricot juice, plum juice, and pineapple juice; citrus juices such as orange juice, lemon juice, lime juice, grapefruit juice, and tangerine juice; and vegetable juice such as carrot juice and tomato juice; or a combination comprising at least one of the foregoing juices.

Unless otherwise indicated, juice as used can include fruit or vegetable liquids containing a percentage of solids derived from the fruit or vegetable, for example pulp, seeds, skins, fibers, and the like, and pectin, which is naturally occurring in the fruit or vegetable. The amount of solids in the juice can be about 1 to about 75 wt %, specifically about 5 to about 60 wt %, more specifically about 10 to about 45 wt %, and yet more specifically about 15 to about 30 wt % each based on the total weight of the juice. Higher concentrations of solids can be found in juice concentrates, purees, and the like.

The amount of juice component present in the juice-based composition generally can be about 0.1 wt % to about 95 wt % based on the total weight of the composition, specifically about 5 wt % to about 75 wt %, and more specifically about 10 wt % to about 50 wt % each based on the total weight of the composition. Amounts may vary depending upon whether the composition is a concentrate or a ready to drink beverage, for example. The remaining components in the juice-based composition can be added water or other suitable liquid, a sweetening agent, a flavoring agent, or other additives as described herein.

The juice-based composition can be non-carbonated or carbonated.

In one embodiment, the juice-based composition is fortified with solubilized calcium in the form of calcium carbonate, calcium oxide, or calcium hydroxide, for example. A food-grade acid is added to the calcium fortified juice-based composition to improve the solubility of calcium. Exemplary food-grade acids suitable for use in the juice-based composition are further discussed herein, specifically citric acid, malic acid, or a combination comprising at least one of the foregoing food-grade acids.

In some embodiments, the juice-based composition can be formed from a fruit or vegetable using a hot break or cold break process. In both processes, the fruit or vegetable is macerated and passed through conventional equipment to separate out seeds, skins and other undesired solids. The composition is then concentrated by conventional techniques. In hot break processes, the fruit or vegetable is typically heated during maceration or immediately thereafter to deactivate enzymes that may degrade the product and decrease the viscosity of the product. In cold break processes, the fruit or vegetable typically are processed at lower temperatures than hot break. A hot break process accordingly may provide a thicker product than those produced by a cold break process.

In one embodiment, the juice-based composition is pasteurized to destroy unwanted microorganisms. Suitable pasteurization conditions of juice-based compositions can be selected by one of ordinary skill in the art without undue experimentation using the guidelines provided. An exemplary pasteurization process to sterilize the juice-based composition is by heating the composition to about 60 to about 80° C. for about 6 to about 15 minutes in an aseptic environment.

In another embodiment, the juice-based composition is filled into a beverage container and then subjected to pasteurization conditions. Alternatively, the composition is hot-filled into a beverage container at temperatures sufficient to sterilize the composition in the container.

In another embodiment, the juice-based composition can contain a preservative allowing the composition to be cold-filled into a beverage container without the need for pasteurization. Specifically, the preservatives can be added to lower the pH level of the beverage to pH of about 3 to about 4.5. Suitable preservatives are discussed in detail herein.

Milk-Based Compositions

Milk-based compositions generally contain a dairy component which can contain varying amounts of milk proteins (e.g., casein, whey protein, and the like), fats, lactose, and water. Exemplary dairy components include yogurt, cream, whole milk, low or reduced fat milk, skim milk, milk solids, condensed milk, or a combination comprising at least one of the foregoing dairy components.

In some embodiments, non-dairy components may replace part or all of the dairy components in the milk-based composition. Suitable non-dairy components include soy milk, almond milk, coconut milk, rice milk, and the like, or a combination comprising at least one of the foregoing.

Stabilizers can be added to the milk-based composition to prevent precipitation. Exemplary stabilizers include hydrocolloids such as pectin, propylene glycol alginate, and the like, as well as the stabilizers described further herein.

The amount of milk proteins in a milk-based beverage composition can be about 0.1% to about 10% by weight based on the total weight of the milk-based beverage composition, specifically about 0.5% to about 5% by weight, and more specifically about 1.0% to about 4% by weight.

The milk-based composition can contain a sweetening agent, coloring agent, or other additives as disclosed herein. The milk-based composition can be non-carbonated or carbonated.

In some embodiments, the milk-based beverage is lactose free.

The process for preparing milk-based beverage compositions generally includes mixing and emulsifying a dairy component or non-dairy component with an emulsifier to form an emulsified component. The emulsified component can be pasteurized, cooled, and blended with a second component, which can contain a flavoring agent, a sweetening agent, other additives, or water or other suitable liquid to form a beverage composition. The blending can be performed under aseptic conditions to ensure product integrity.

Suitable conditions for the pasteurization of milk-base compositions can be selected by one of ordinary skill in the art without undue experimentation using the guidelines provided. An exemplary pasteurization process to sterilize the emulsified component or other dairy component can be effected at temperatures of about 130 to about 140° C. for about 30 seconds to about 2 minutes in an aseptic environment. Alternatively, the pasteurization can be performed at about 115 to about 125° C. for about 20 to about 30 minutes in an aseptic environment.

In another embodiment, the milk-based composition is filled into a beverage container and then subjected to the pasteurization conditions.

Alcoholic Compositions

The compositions described herein may further comprise an alcoholic composition. Examples of suitable alcoholic compositions include beer, spirit, liqueur, wine, or a combination comprising at least one of the foregoing. In some embodiments, the level of alcohol, as measured by the amount of ethanol contained in the beverage composition can be about 0.5 vol % to about 20 vol % based on the total volume of the beverage composition.

Carbonated Compositions

A carbonated beverage composition typically contains about 0.1 to about 5.0 volumes of gas or gasses, typically carbon dioxide, per volume of the beverage composition. The carbonation can be effected by forceful introduction of the gas under pressure to the beverage composition. Cooling the beverage composition allows for greater amounts of carbon dioxide to be solubilized by the beverage composition. Carbonation can be used to enhancing the flavor, sweetness, taste, and mouth-feel of the composition. Additionally, carbonation lowers the pH of the composition.

In one embodiment, the carbonation can be added to the finished, noncarbonated beverage composition, which contains all of the desired beverage components.

In another embodiment, the carbonation is added to a desired volume of water to form a carbonated water. The carbonated water can then be combined with a composition such as a beverage concentrate or beverage syrup to produce the finished carbonated beverage composition.

Once the carbonated beverage composition has been prepared, the carbonated beverage composition can be packaged in containers and sealed using methods, packaging, and equipment selected by those of ordinary skill in the art without undue experimentation.

In some embodiments, carbonation can be added at the point of consumption. For example, in a restaurant or convenience store, a fountain beverage consisting of a beverage syrup and a source of carbonation is prepared for imminent consumer consumption.

Frozen Compositions

A "frozen beverage composition" as used herein includes a beverage composition having ice crystals suspended therein to provide a viscous, yet drinkable beverage. The consistency of the frozen beverage composition allows it to have a "slushy" or "spoonable" consistency. The ice crystals can be present in the frozen beverage composition in an amount of about 20 to about 90 wt %, specifically about 30 to about 70 wt %, and yet more specifically about 40 to about 50 wt % ice solids each based on the total weight of the frozen beverage composition.

Due to the lower temperature of the frozen beverage composition compared with other beverages, choice in the amount of flavoring agent and/or sweetening agent can be different. Suitable amounts of flavoring agent and sweetening agent can be selected by one of ordinary skill in the art without undue experimentation.

The frozen beverage composition can contain a buffering salt, which aids in lowering the freezing point of the beverage composition and to maintain the "slushy" texture. Suitable buffering salts include sodium, potassium, and calcium salts of citric acid or phosphoric acid: sodium citrate, potassium citrate, disodium phosphate, dipotassium phosphate, monocalcium phosphate, tricalcium phosphate, or a combination comprising at least one of the foregoing buffering salts.

Gel Compositions

A "gel beverage composition" as used herein includes a beverage composition having a thickening agent to provide a viscous, yet drinkable beverage. The consistency of the gel beverage composition allows it to have a "semi-solid" or "spoonable" consistency. Thickening agents (sometimes referred to as hydrocolloids) can include, but are not limited to natural and synthetic gums, for example locust bean gum, guar gum, gellan gum, xanthan gum, gum ghatti, modified gum ghatti, tragacanth gum, carrageenan, and the like; natural and modified starches, for example pregelatinized starch (corn, wheat, tapioca), pregelatinized high amylose-content starch, pregelatinized hydrolyzed starches (maltodextrins, corn syrup solids), chemically modified starches such as pregelatinized substituted starches (e.g., octenyl succinate), and the like; cellulose derivatives, for example carboxymethylcellulose, sodium carboxymethylcellulose, and the like; polydextrose; whey or whey protein concentrate; pectin; gelatin; or a combination comprising at least one of the foregoing thickening agents.

Due to the textural difference of the gel beverage composition compared with other beverages, choice in the amount of flavoring agent and/or sweetening agent can be different. Suitable amounts of flavoring agent and sweetening agent can be selected by one of ordinary skill in the art without undue experimentation.

Any of the beverage compositions described herein may include flavors and sweeteners, as described above, and a variety of optional additives. For instance, in some embodiments, the beverage composition may include additive sweeteners, such as Lo han guo, stevia, monatin, or the like, or combinations thereof. In some embodiments, the composition may include optional additives such as antioxidants, amino acids, caffeine, coloring agents ("colorants", "colorings"), emulsifiers, flavor potentiators, food-grade acids, minerals, micronutrients, plant extracts, phytochemicals ("phytonutrients"), preservatives, salts including buffering salts, stabilizers, thickening agents, medicaments, vitamins, or a combination comprising at least one of the foregoing additives. Those of ordinary skill in the art will appreciate that certain additives may meet the definition or function according to more than one of the above-listed additive categories.

Suitable salts for use in the composition include, alkali or alkaline earth metal chlorides, glutamates, and the like. For example, monosodium glutamate, potassium chloride, sodium chloride, or a combination comprising at least one of the foregoing salts. The salts can be added to the beverage as a flavor potentiator as previously described.

Suitable food-grade acids for use in the composition include, for example, acetic acid, adipic acid, ascorbic acid, butyric acid, citric acid, formic acid, fumaric acid, glyconic acid, lactic acid, malic acid, phosphoric acid, oxalic acid, succinic acid, tartaric acid, or a combination comprising at least one of the foregoing food-grade acids. The food-grade acid can be added as acidulant to control the pH of the beverage and also to provide some preservative properties; or to stabilize the beverage.

The pH of the beverage may also be modified by the addition of food-grade compounds such as ammonium hydroxide, sodium carbonate, potassium carbonate, sodium bicarbonate, and the like, or a combination comprising at least one of the foregoing. Additionally, the pH of the beverage can be adjusted by the addition of carbon dioxide.

In some embodiments, the tartness of the beverage may be varied by selecting and combining acids to provide a desired tartness perception. Some factors to consider in determining a desired tartness include, but are not limited to, the acid's dissociation constant, solubility, pH, etc. These variables can be measured by measuring the titratable acidity of the beverage composition.

Coloring agents can be used in amounts effective to produce a desired color for the composition. The colorants may include pigments, natural food colors and dyes suitable for food, drug and cosmetic applications. A full recitation of all F.D.& C. colorants and their corresponding chemical structures can be found in the Kirk-Othmer Encyclopedia of Chemical Technology, 3rd Edition, in volume 5 at pages 857-884, of which text is incorporated herein by reference.

As classified by the United States Food, Drug, and Cosmetic Act (21 C.F.R. 73), colors can include exempt from certification colors (sometimes referred to as natural even though they can be synthetically manufactured) and certified colors (sometimes referred to as artificial), or a combination comprising at least one of the foregoing. In some embodiments, exemplary exempt from certification or natural colors can include, annatto extract, (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violaxanthin (E161e), rhodoxanthin (E161f), caramel (E150(a-d)), β-apo-8'-carotenal (E160e), β-carotene (E160a), alpha carotene, gamma carotene, ethyl ester of beta-apo-8 carotenal (E160f), flavoxanthin (E161a), lutein (E161b), cochineal extract (E120); carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), or a combination comprising at least one of the foregoing.

In some embodiments, exemplary certified colors can include FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), or a combination comprising at least one of the foregoing. In some embodiments, certified colors can include FD&C aluminum lakes. These consist of the aluminum salts of FD&C dyes extended on an insoluble substrate of alumina hydrate. Additionally, in some embodiments, certified colors can be included as calcium salts.

Acceptable coloring agents are specifically water-soluble coloring agents.

Suitable amounts of colorant to provide the desired visual effect can be selected by one of ordinary skill in the art without undue experimentation using guidelines provided. Exemplary amounts of coloring agents can be about 0.005 to about 15 wt %, specifically about 0.01 to about 6 wt %, and more specifically about 0.1 to about 2 wt % each based on the total weight of the composition.

Emulsifiers can be added to the composition to prevent separation of the composition components by keeping ingredients dispersed. Emulsifiers can include molecules which have both a hydrophilic part and a hydrophobic part. Emulsifiers can operate at the interface between hydrophilic and hydrophobic materials of the beverage to prevent separation of the components of the composition. Suitable emulsifiers for use in the compositions include, for example, lecithin (e.g., soy lecithin); mono and di-glycerides of long chain fatty acids, specifically saturated fatty acids, and more specifically, stearic and palmitic acid mono- and diglycerides; mono and di-glycerides of acetic acid, citric acid, tartaric acid, or lactic acid; egg yolks; polysorbates (e.g., polysorbate 20, polysorbate 40, polysorbate 60, polysorbate 65, and polysorbate 80), propylene glycol esters (e.g, propylene glycol monostearate); propylene glycol esters of fatty acids; sorbitan esters (e.g., sorbitan monostearates, sorbitan tristearates, sorbitan monolaurate, sorbitan monooleate), Acacia (gum arabic), sucrose monoesters; polyglycerol esters; polyethoxylated glycerols; and the like, or a combination comprising at least one of the foregoing emulsifiers.

The beverage composition may contain an emulsifier in an amount of about 0.001% to about 2.00%, specifically about 0.005% to about 1.00%, more specifically about 0.01% to about 0.5%, and yet more specifically about 0.05% to about 0.1% by weight of the composition.

Certain components (sometimes referred to as hydrocolloids) that act as thickening agents which can impart added "mouth-feel" to the composition include natural and synthetic gums, for example locust bean gum, guar gum, gellan gum, xanthan gum, gum ghatti, modified gum ghatti, tragacanth gum, carrageenan, and the like; natural and modified starches, for example pregelatinized starch (corn, wheat, tapioca), pregelatinized high amylose-content starch, pregelatinized hydrolyzed starches (maltodextrins, corn syrup solids), chemically modified starches such as pregelatinized substituted starches (e.g., octenyl succinate), and the like; cellulose derivatives, for example carboxymethylcellulose, sodium carboxymethylcellulose, and the like; polydextrose; whey or whey protein concentrate; pectin; gelatin; or a combination comprising at least one of the foregoing thickening agents.

The composition may contain a thickening agent in an amount of about 0.001% to about 10%, specifically about 0.005% to about 5%, more specifically about 0.01% to about 1%, and yet more specifically about 0.05% to about 0.5% by weight of the composition.

Preservatives, including antimicrobials, can be added to the composition to provide freshness and to prevent the unwanted growth of bacteria, molds, fungi, or yeast. The addition of a preservative, including antioxidants, may also be used to maintain the composition's color, flavor, or texture. Any suitable preservatives for use in food and beverage products can be incorporated into the compositions. Examples of suitable preservatives include benzoic acid alkali metal salts (e.g., sodium benzoate), sorbic acid alkali metal salts (e.g., potassium sorbate), ascorbic acid (Vitamin C), citric acid, calcium propionate, sodium erythorbate, sodium nitrite, calcium sorbate, butylated hydroxyanisole (BHA), butylated hydroxytoluene (BHT), ethylenediaminetetraacetic acid (EDTA), tocopherols (Vitamin E), straight chain polyphosphates, or a combination comprising at least one of the foregoing preservatives.

The composition may contain the preservative or preservative combination in an amount of about 0.0001% to about 0.10%, specifically about 0.001% to about 0.08%, more specifically about 0.005% to about 0.05%, and yet more specifically about 0.01% to about 0.04% by weight of the composition.

The composition may be fortified or enriched with vitamins, minerals, micronutrients, or other nutrients. Micronutrients can include materials that have an impact on the nutritional well being of an organism even though the quantity required by the organism to have the desired effect is small relative to macronutrients such as protein, carbohydrate, and fat. Micronutrients can include, but are not limited to vitamins, minerals, enzymes, phytochemicals, antioxidants, and combinations thereof.

Suitable vitamins or vitamin precursors include ascorbic acid (Vitamin C), beta carotene, niacin (Vitamin $B_3$), riboflavin (Vitamin $B_2$), thiamin (Vitamin $B_1$), niacinamide, folate or folic acid, alpha tocopherols or esters thereof, Vitamin D, retinyl acetate, retinyl palmitate, pyridoxine (Vitamin $B_6$), folic acid (Vitamin $B_9$), cyanocobalamin (Vitamin $B_{12}$), pantothenic acid, biotin, or a combination comprising at least one of the foregoing vitamins.

In some embodiments, vitamins or vitamin precursors may include fat soluble vitamins such as vitamin A, vitamin D, vitamin E, and vitamin K and combinations thereof. In some embodiments, vitamins or vitamin precursors can include water soluble vitamins such as vitamin C (ascorbic acid), the B vitamins (thiamine or $B_1$, riboflavin or $B_2$, niacin or $B_3$, pyridoxine or $B_6$, folic acid or $B_9$, cyanocobalamin or $B_{12}$, pantothenic acid, biotin), and combinations thereof.

Exemplary minerals include sodium, magnesium, chromium, iodine, iron, manganese, calcium, copper, fluoride, potassium, phosphorous, molybdenum, selenium, zinc, or a combination comprising at least one of the foregoing minerals. The minerals can be provided as a mineral salt, including carbonate, oxide, hydroxide, chloride, sulfate, phosphate, pyrophosphate, gluconate, lactate, acetate, fumarate, citrate, malate, amino acids and the like for the cationic minerals and sodium, potassium, calcium, magnesium and the like for the anionic minerals.

The amount of vitamins or minerals provided in the compositions may be up to or exceeding amounts generally recognized as U.S. Recommended Daily amounts or the Recommended Daily Intake amounts established by the U.S. Food and Drug Administration.

In some embodiments micronutrients may include but are not limited to L-carnitine, choline, coenzyme Q10, alpha-lipoic acid, omega-3-fatty acids, pepsin, phytase, trypsin, lipases, proteases, cellulases, and combinations thereof.

Antioxidants may include materials that scavenge free radicals. In some embodiments, antioxidants can include but are not limited to ascorbic acid, citric acid, rosemary oil, vitamin A, vitamin E, vitamin E phosphate, tocopherols, di-alpha-tocopheryl phosphate, tocotrienols, alpha lipoic acid, dihydrolipoic acid, xanthophylls, beta cryptoxanthin, lycopene, lutein, zeaxanthin, astaxanthin, beta-carotene, carotenes, mixed carotenoids, polyphenols, flavonoids, and combinations thereof.

Exemplary nutrients also may include amino acids such as L-tryptophan, L-lysine, L-leucine, L-methionine, 2-aminoethanesulfonic acid (taurine), and L-carnitine; creatine; glucuronolactone; inositol; or a combination comprising at least one of the foregoing nutrients.

Phytochemicals ("phytonutrients") are plant derived compounds which may provide a beneficial effect on the health or well-being of the consumer. Phytochemicals include plant derived antioxidants, phenolic compounds including monophenols and polyphenols, and the like. Exemplary phytochemicals include lutein, lycopene, carotene, anthocyanin, capsaicinoids, flavonoids, hydroxycinnamic acids, isoflavones, isothiocyanates, monoterpenes, chalcones, coumestans, dihydroflavonols, flavanoids, flavanols, quercetin, flavanones, flavones, flavan-3-ols (catechins, epicatechin, epigallocatechin, epigallocatechingallate, and the like), flavonals (anthocyanins, cyanidin, and the like); phenolic acids; phytosterols, saponins, terpenes (carotenoids), or a combination comprising at least one of the foregoing phytochemicals.

The phytochemicals may be provided in substantially pure or isolated form or in the form of natural plant extracts. Suitable plant extracts which contain one or more phytochemicals include fruit skin extracts (grape, apple, crab apple, and the like), green tea extracts, white tea extracts, green coffee extract, or a combination comprising at least one of the foregoing extracts.

Various herbals, aromatic plants or plant parts or extracts thereof, also may be included in the compositions for a variety of reasons such as for flavor or for their potential health benefits. Exemplary herbals include Echinacea, Goldenseal, Calendula, Rosemary, Thyme, Kava Kava, Aloe, Blood Root, Grapefruit Seed Extract, Black Cohosh, Ginseng, Guarana, Cranberry, Ginko Biloba, St. John's Wort, Evening Primrose Oil, Yohimbe Bark, Green Tea, Ma Huang, Maca, Bilberry, extracts thereof, or a combination comprising at least one of the foregoing herbals.

Concentrate Compositions

Concentrate compositions may be in dry form (e.g., powder or tablet) or in liquid form (e.g., syrup, suspension, or emulsion). Concentrate compositions typically include the flavoring agent in a volume of liquid medium that is less than the volume of liquid medium found in the finished beverage. Other optional components in the concentrate include sweetening agents, coloring agents, and other additives such as food-grade acids, preservatives, and the like. The bulk of the liquid component of a finished beverage composition is not present in the concentrate to allow for reduced weight, volume, storage and shipping costs while at the same time allowing for increased shelf life of the concentrate versus beverage composition.

In one embodiment, the concentrate composition is formulated to provide final beverage compositions upon dilution with about a 2-fold to about a 5-fold by volume, specifically about 3-fold to about a 4-fold by volume of a liquid. The liquid may be water, juice, dairy component, a non-dairy milk, ethanol, a combination comprising at least one of the foregoing, and the like. The liquid may be in noncarbonated or carbonated form.

Processing and Packaging of Beverage Products

In some embodiments, the beverage composition is subject to homogenization conditions, such as high pressure homogenization, to provide a homogenous composition. The beverage component used to prepare a beverage composition or concentrate composition can be homogenized alone, or alternatively, juice and other components can be homogenized together to form a homogenized beverage composition or homogenized concentrate composition.

High pressure homogenization may be used and in some embodiments, juice solids are mashed under pressure. In general, homogenization processes alter the size and distribution of the fruit or vegetable pulp particles. More specifically, homogenization may break down and uniformly distribute the lipophilic components, the fruit or vegetable pulp particles, etc. throughout the composition. In addition, homogenization may modify the fruit or vegetable fibers found in the composition by reducing the length and fraying the ends of the fibrous materials. This may allow the fiber strands to absorb more liquid. Overall, homogenization may produce a more uniform composition having increased viscosity. Homogenization accordingly may impart a smoother mouthfeel to the composition.

In some embodiments, homogenization pressures of about 1000 pounds per square inch (psi) to about 4000 psi is used. Any conventional homogenization equipment can be employed, such as equipment available from APV Gaulin, Alfa-Laval or Niro Soavi.

In some embodiments, the beverage composition is pasteurized to sterilize the product by destroying unwanted microorganisms. Exemplary processes to destroy or remove unwanted microorganisms include hot-filling, aseptic packaging, ozonation, radiation (e.g., ultraviolet light or gamma rays), membrane permeation, pulsed electric field, sonication, and the like.

Depending upon the components of the beverage composition, pasteurization may be effected at different temperatures. For dairy, grain, fruit or vegetable-based beverage compositions a pasteurization temperature of about 60 to about 80° C. can be sufficient, specifically about 65 to about 75° C., and more specifically about 68 to about 72° C. More specifically, the fruit or vegetable-based beverage composition can be pasteurized by heating to the desired temperature for about 6 about 15 minutes in an aseptic environment, more specifically about 8 about 12 minutes, and yet more specifically about 9 about 11 minutes.

For milk-based beverage compositions, a pasteurization temperature of about 60° C. to about 80° C. may be used, specifically about 65° C. to about 75° C., and more specifically about 68° C. to about 72° C. More specifically, the milk-based beverage composition may be pasteurized by heating to the desired temperature for about 6 about 15 minutes in an aseptic environment, more specifically about 8 about 12 minutes, and yet more specifically about 9 about 11 minutes.

The beverage composition may be bulk pasteurized and then filled into a desired beverage container. In some embodiments, the beverage composition is filled into the desired beverage container, such as a glass bottle, and then subjected to the pasteurization conditions.

Alternatively, in some embodiments, the beverage composition is hot-filled into the desired beverage container. More specifically, the beverage composition is filled into the beverage container at temperatures sufficient to sterilize the composition in the container, for example about 85° C. After several minutes, the container and composition can be cooled down to about 32 to about 38° C.

In other embodiments, the beverage composition is cold-filled into a desired beverage container. In such embodiments, preservatives can be added to the beverage composition. More specifically, cold-filling the beverage involves adding the beverage to the beverage container at ambient temperature (e.g., about 21° C.). Preservatives, such as those described herein, can be added to the composition to lower the pH level of the composition. Desirable pH values can be about 3 to about 4.5. Cold-filling with preservatives is used in some embodiments as an alternative to pasteurization.

In some embodiments, aseptic processes can be used to provide shelf stable, sterile beverages.

The beverage compositions may be packaged, ready-to-drink, and can be shelf stable. Any type of beverage packaging may be used to package the beverage composition including glass bottles, plastic bottles and containers (e.g., polyethylene terephthalate or foil lined ethylene vinyl alcohol), metal cans (e.g., coated aluminum or steel), lined cardboard containers, and the like. Other beverage packaging material known to one of ordinary skill in the art may be used.

The present invention also provides methods of maintaining a desired sweetness intensity in a beverage composition. In accordance with such methods, a desired sweetness intensity first may be determined. Once the desired sweetness intensity is determined, a quantity of natural or artificial sweetener may be added to a beverage composition that supplies a sweetness intensity less intense than the desired sweetness intensity. Subsequently, a quantity of a sweetener potentiator composition including 3-HB and 2,4-DHB may be added to the beverage composition such that the desired sweetness intensity is delivered.

In accordance with some other embodiments, methods of increasing the sweetness intensity of a beverage composition are provided. A quantity of natural or artificial sweetener first may be added to a beverage composition. Subsequently, a sweetness intensity derived from the quantity of the natural or artificial sweetener may be determined. Then a quantity of a sweetener potentiator composition including 3-HB and 2,4-DHB may be added to the beverage composition such that the sweetness intensity is greater than the sweetness intensity derived from the natural or artificial sweetener.

In some other embodiments, methods of reducing the amount of natural or artificial sweeteners in a beverage composition are provided. In accordance therewith, an amount of natural or artificial sweetener in a beverage composition that provides a desired sweetness intensity first may be determined. That amount may be reduced and a quantity of a sweetener potentiator composition including 3-HB and 2,4-DHB may be added to the beverage composition such that the desired sweetness intensity is maintained.

The features and advantages are more fully shown by the following examples which are provided for purposes of illustration, and are not to be construed as limiting the invention in any way.

EXAMPLES

Example 1

Sucrose Equivalent Value (SEV)

One method of measuring the perceived sweetness of a solution is to match it with a stock sucrose solution of known concentration. In the present experiments, the compound of interest is added at a predetermined concentration to a pH 3.2 buffered solution containing 5% sucrose. A number of expert panel members then taste the solution and compare it to a battery of stock sucrose solutions ranging from 3% to 15% at increments of 1%. Each panel member decides which sucrose solution is equisweet with the solution containing the compound of interest. The mean value is then reported as the SEV. Results are reported to 1 decimal place.

Dose Response Curve for 3-Hydroxybenzoic Acid

In accordance with this methodology, 3-HB was added to a pH 3.2 buffered solution containing 5% sucrose to produce solutions containing from 0 to 1000 ppm 3-HB in 100 ppm increments. The SEV for each solution was plotted on a graph to produce a dose response curve (FIG. 1), from which it can be seen that 3-HB enhances the sweetness of the sucrose solution within this range. From FIG. 1 it is apparent that as the dosage of 3-HB increases so does the sweetness of the resultant solution. However the effect is non-linear with each incremental addition having a diminishing effect. The maximum sweetness attainable would appear to be about 7.9% SEV (based on a 5% sucrose solution).

Example 2

Dose Response Curve for 2,4-Dihydroxybenzoic Acid

Figure 2:
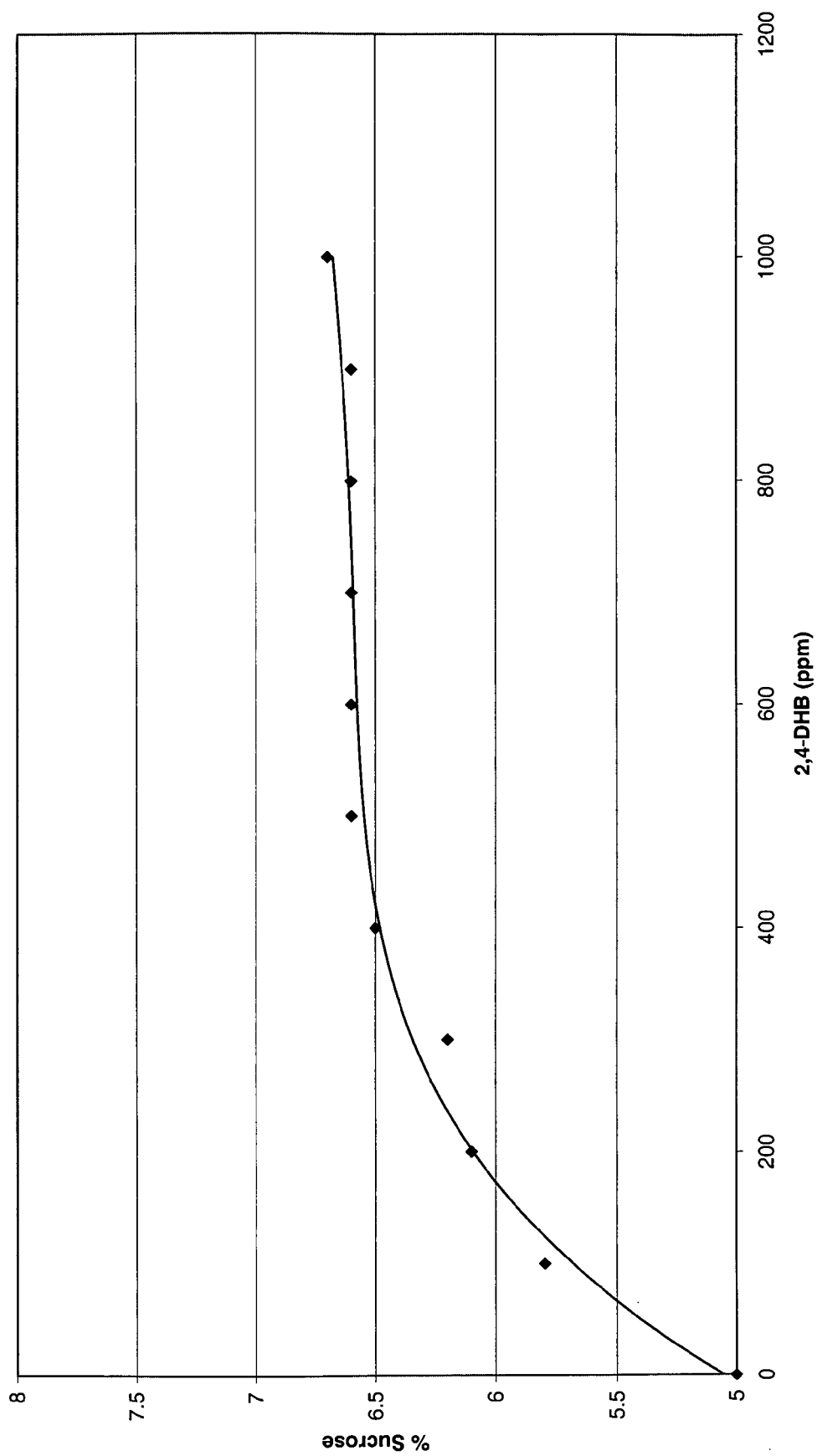
FIG. 2 is a graph of 2,4-dihydroxybenzoic acid concentration against perceived sweetness.

The same methodology as described in Example 1 was repeated with 2,4-DHB in place of 3-HB, to produce the dose response curve for 2,4-DHB (FIG. 2). From FIG. 2 it can be seen that 2,4-DHB also enhances the sweetness of the sucrose solution but there is little difference between the 400 ppm solution (SEV 6.5%) and the 1000 ppm solution (SEV 6.7%). The maximum attainable sweetness would appear to be about 6.7% SEV (based on a 5% sucrose solution).

Example 3

Sucrose Reduction Method

An alternative method of measuring perceived sweetness is to determine how much sucrose can be replaced through the use of the compound of interest without any perceived loss of sweetness. In the present experiments the control was a pH 3.2 buffered solution containing 10% sucrose. The compound of interest is added at a predetermined concentration to a number of sucrose solutions containing from 5% to 10% sucrose at increments of 0.5%. Each panel member tastes each of the solutions, compares it to the control sample and decides which solutions are equisweet. For example, if the 8% sucrose solution containing the compound of interest is equisweet with the control, then the sucrose reduction achieved by the compound of interest is 20%.

Effect of Relative Concentration on Sucrose Reduction for 3-HB, 2,4-DHB Mixtures A series of sucrose solutions were prepared containing 3-HB and 2,4-DHB at a combined concentration of 1000 ppm. Each solution was evaluated using the sucrose reduction method described above to determine how much sucrose could be replaced without noticeable loss of sweetness. The results are shown in FIG. 3.

Figure 3:
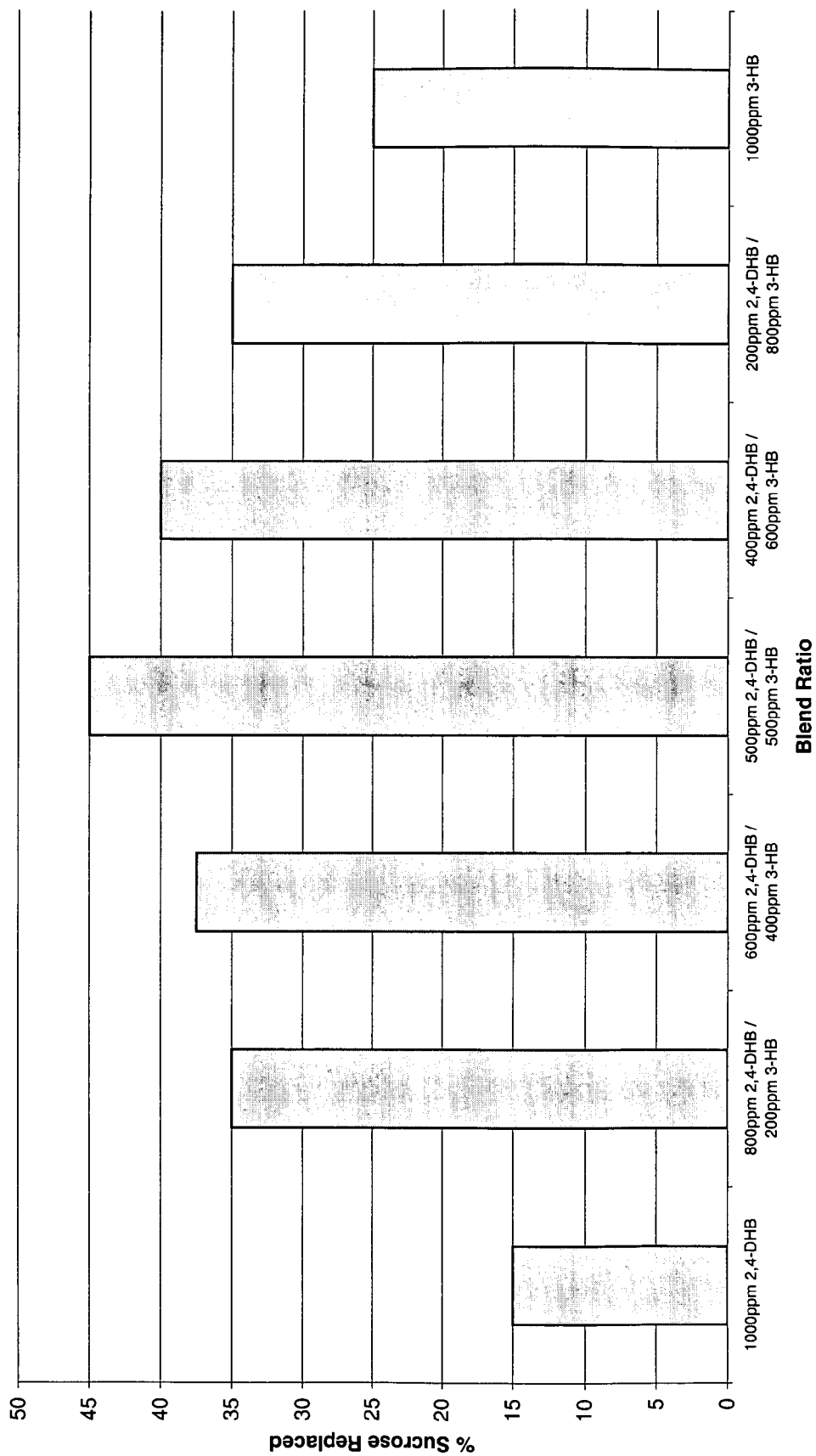
FIG. 3 is a bar chart of sucrose reduction for solutions containing 3-hydroxybenzoic acid and 2,4-dihydroxybenzoic acid in a number of different ratios.

As shown in FIG. 3, the greatest reduction is observed when equal quantities of 3-HB and 2,4-DHB are employed. This ratio results in the very significant sucrose reduction of 45%. This figure is highly surprising considering that the use of 1000 ppm of 3-HB or 2,4-DHB individually results in a reduction of just 25% and 15% respectively. The other ratios 3-HB:2,4-DHB (8:2, 6:4, 4:6 and 2:8) are also very effective; each combination results in a sucrose reduction of at least 35%.

Example 4

Effect of Concentration on Sucrose Reduction for 1:1 3-HB:2,4-DHB Mixtures

Figure 4:
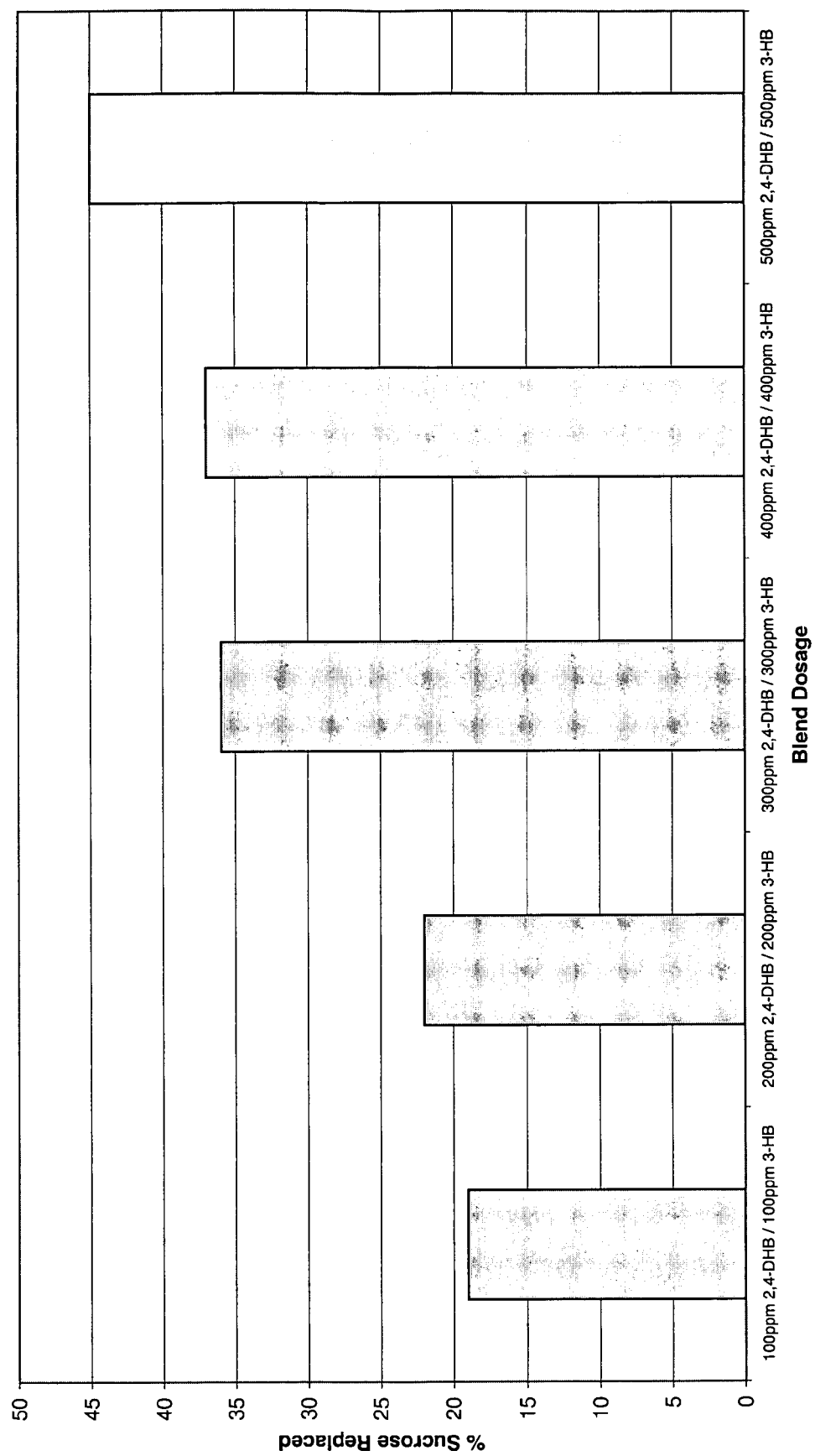
FIG. 4 is a bar chart of sucrose reduction for solutions containing 3-hydroxybenzoic acid and 2,4-dihydroxybenzoic acid at a number of different concentrations.

A series of sucrose solutions were prepared containing equal quantities of 3-HB and 2,4-DHB, at a combined concentration of 200, 400, 600, 800 and 1000 ppm. Each solution was evaluated using the sucrose reduction method described in Example 3 above to determine how much sucrose could be replaced without noticeable loss of sweetness. The results are shown in FIG. 4.

Increasing the total quantity of 3-HB and 2,4-DHB while retaining a 1:1 ratio increases the sweetness enhancing effect. As shown above 500 ppm 3-HB+500 ppm 2,4-DHB results in 45% of the sucrose being replaced without loss of sweetness. However, the combination of 3-HB and 2,4-DHB is effective even at very low concentration. The use of just 200 ppm of each of 3-HB and 2,4-DHB allows the sucrose content to be reduced by 22%.

Example 5

Sucrose Equivalent Values for Various Benzoic Acid Derivatives and Combinations Thereof 500 ppm of a sweetener potentiator was added to a pH 3.2 buffered solution containing 5% sucrose and the SEV of the resultant solution determined. The results are shown in Table 2.

TABLE 2

| Sweetness potentiator | SEV (%) |
| --- | --- |
| 2-hydroxybenzoic acid (2-HB) | 5.6 |
| 3-hydroxybenzoic acid (3-HB) | 6.9 |

TABLE 2-continued

| Sweetness potentiator | SEV (%) |
| --- | --- |
| 4-hydroxybenzoic acid (4-HB) | 5.2 |
| 2,3-dihydroxybenzoic acid (2,3-DHB) | 6.3 |
| 2,4-dihydroxybenzoic acid (2,4-DHB) | 6.5 |
| 2,5-dihydroxybenzoic acid (2,5-DHB) | 5.3 |
| 2,6-dihydroxybenzoic acid (2,6-DHB) | 5.3 |
| 3,4-dihydroxybenzoic acid (3,4-DHB) | 6.4 |
| 3,5-dihydroxybenzoic acid (3,5-DHB) | 5.3 |
| 2,3,4-trihydroxybenzoic acid (2,3,4-THB) | 5.4 |
| 2,4,6-trihydroxybenzoic acid (2,4,6-THB) | 5.4 |
| 3,4,5-tryhydroxybenzoic acid (3,4,5-THB) | 5.1 |

Figure 5:
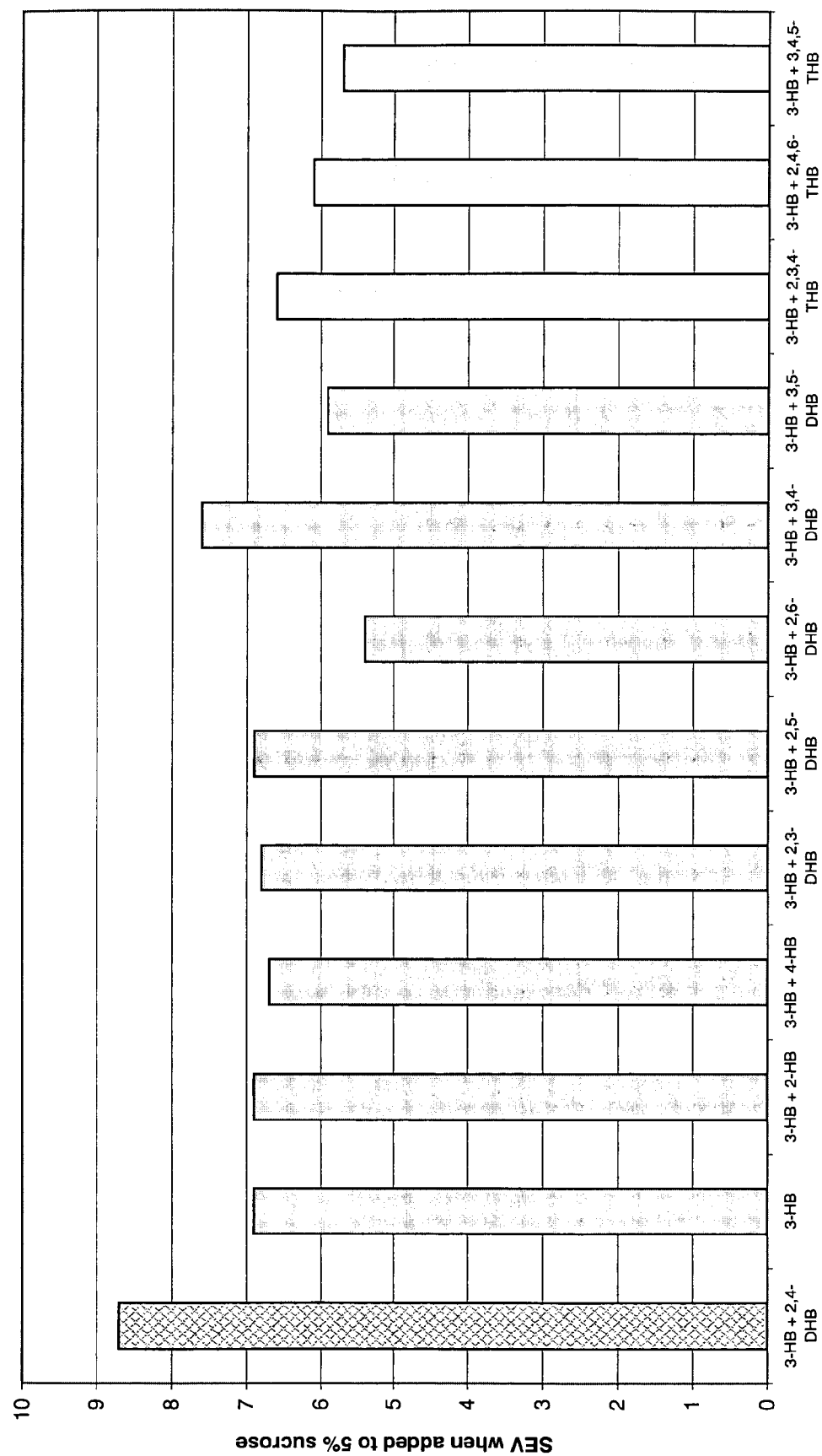
FIG. 5 is a bar chart of perceived sweetness for a number of solutions containing substituted benzoic acids.

500 ppm of the sweetener potentiator then was added to a 5% sucrose solution containing 500 ppm 3-HB to produce a series of solutions. The SEV for each solution was determined and the results are shown in FIG. 5. As shown in FIG. 5, the composition of one embodiment (hatched) is considerably more effective than any other combination with an SEV of 8.7%. The use of 500 ppm of 3-HB alone results in an SEV of 6.9% whereas in all cases but two (2,4-DHB and 3,4-DHB) the addition of a second sweetener potentiator results in a little change or even a decrease in SEV. This is highly surprising considering that all of the potentiators are shown to have SEVs greater than 5%.

Figure 6:
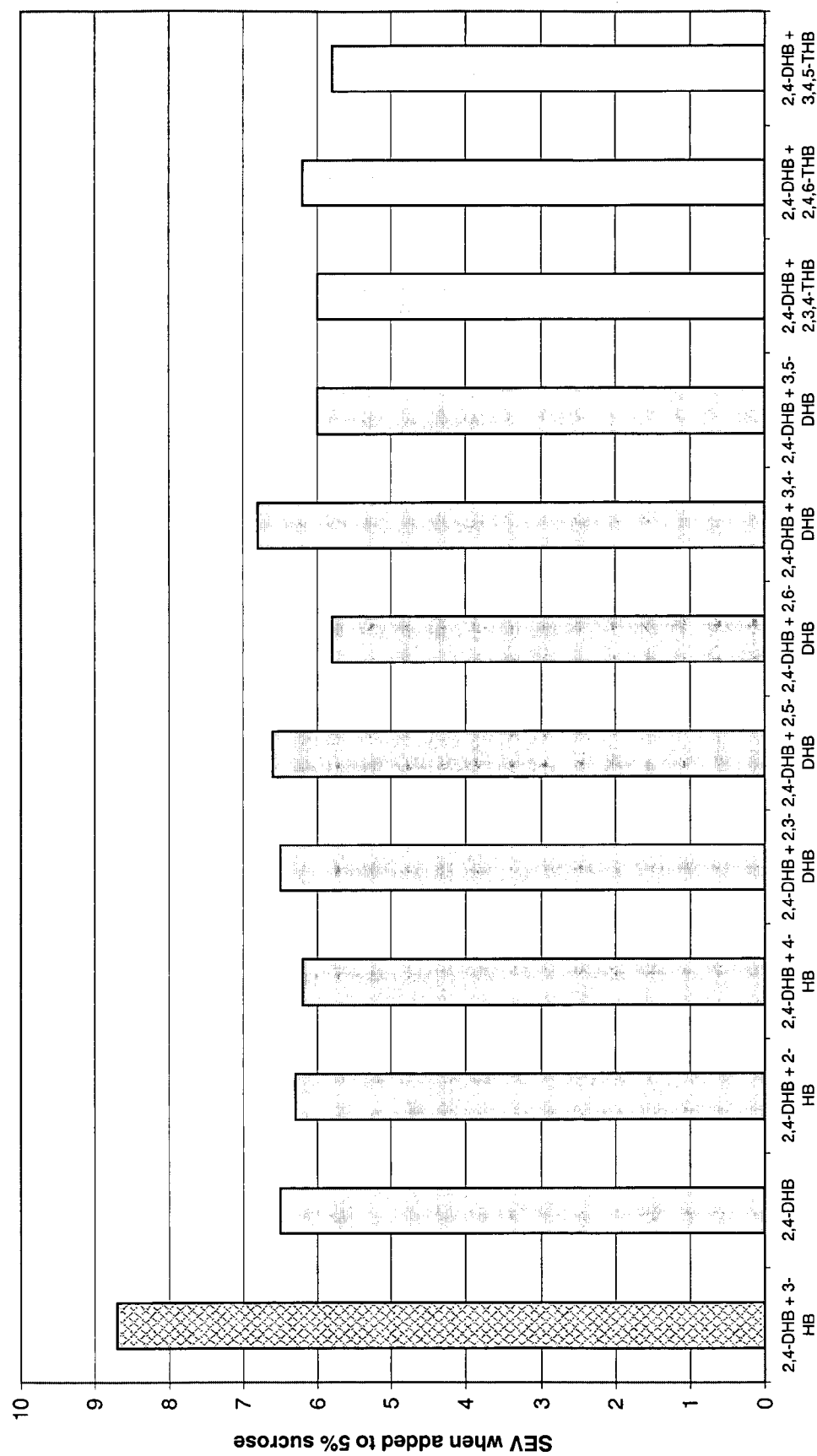
FIG. 6 is a bar chart of perceived sweetness for a number of solutions containing substituted benzoic acids.

The methodology was repeated to produce a series of solutions containing 500 ppm 2,4-DHB and 500 ppm of a second sweetener potentiator. The SEV for each solution was determined and the results are shown in FIG. 6.

Again the combination (hatched) of 3-HB and 2,4-DHB results in by far the greatest sweetness enhancement. It might be expected that 2-HB or 4-HB could be used in place of 3-HB but these combinations result in solutions with SEVs of just 6.3% and 6.2% respectively. The use of 500 ppm 2,4-DHB alone results in a solution with an SEV of 6.5%. The addition of a second sweetener potentiator appears to inhibit its effect in most cases and only the addition of 3-HB has a significant positive effect.

500 ppm of 3-HB, 500 ppm of 2,4-DHB and 500 ppm of 3,4-dihydroxybenzoic acid (3,4-DHB) were added to a pH 3.2 buffered solution containing 5% sucrose and the SEV determined. The results are shown in FIG. 7 together with other combinations of 3-HB, 2,4-DHB and 3,4-DHB for comparison. The solution containing the combination of 3-HB and 2,4-DHB (hatched) has a much higher SEV (8.7%) than the combination of either 3,4-DHB and 3-HB (7.6%) or the combination of 3,4-DHB and 2,4-DHB (6.8%). The three-way combination of the embodiment (hatched) is better still with an SEV of 9.8%.

Example 6

Comparison of Different Forms of 2,4-DHB pH 3.2 buffered solutions were prepared containing 0%, 3%, 5%, 7% and 9% sucrose. 500 ppm of 2,4-DHB acid, 500 ppm of the sodium salt of 2,4-DHB and 500 ppm of the potassium salt of 2,4-DHB were added individually to each of the sucrose solutions. The SEV for each of the solutions was then determined. The results are shown in FIG. 8.

As shown in FIG. 8, the addition of 2,4-DHB enhances the sweetness of the sucrose solution in every case regardless of the original sucrose solution or whether the acid, sodium salt or potassium salt is employed. The results for the acid, sodium salt and potassium salt are almost identical indicating that the sweetener potentiator composition may be prepared from the acids and/or from their comestible salts.

Example 7

Sweetness Enhancing Effect of 3-HB and 2,4-DHB on Non-Sucrose Sweeteners

Solutions were prepared at a pH of 3.2 containing a sufficient quantity of a non-sucrose sweetener so that the resulting solution had an SEV of about 5%. The SEV of each sweetener solution was then evaluated after the addition 500 ppm of 3-HB, the addition of 500 ppm of 2,4-DHB and the addition of both 500 ppm 3-HB and 2,4-DHB. The results are shown in FIGS. 9 and 10.

FIG. 9 shows the results of various intense sweeteners with 3-HB, 2,4-DHB and combinations thereof. As shown in FIG. 9, the combination of 3-HB and 2,4-DHB with aspartame has a significant effect on SEV, which is greater than the use of either 3-HB or 2,4-DHB separately. Similarly, the combination of 3-HB and 2,4-DHB enhances the perceived sweetness of the acesulfame-K, aspartame/acesulfame-K, sucralose, sucralose/acesulfame-K, saccharin and neotame solutions. With respect to the saccharin solution, however, 3-HB enhances the sweetness to a greater degree alone than in combination with 2,4-DHB.

FIG. 10 shows the results of various bulk sweeteners with 3-HB, 2,4-DHB and combinations thereof. As seen in FIG. 10, the combination of 3-HB and 2,4-DHB increases the SEV of the resultant solution when used with sucrose, fructose, tagatose, maltitol or glucose to a greater extent than either 3-HB or 2,4-DHB separately.

Example 8

Sucrose Equivalent Values for Aminobenzoic Acid Derivatives 500 ppm of 3-aminobenzoic acid and 500 ppm of 4-aminobenzoic acid were individually added to separate pH 3.2 buffered solutions containing 5% sucrose and the SEVs of the resultant solutions were determined. The SEV of 3-aminobenzoic acid was about 7%, i.e., increased the sweetness intensity of 5% sucrose to about 7%. The SEV of 4-aminobenzoic acid was about 5.5-6%, i.e., increased the sweetness intensity of 5% sucrose to about 5.5-6%.

Example 9

TABLE 3

Carbonated Beverage Containing Sweetener Potentiators 2,4-DHB and 3-HB

| Component | Control % (w/v) | Inventive % (w/v) |
| --- | --- | --- |
| High fructose corn syrup | 45.0 | 45.0 |
| Lemon-lime flavor | 0.75 | 0.75 |
| Citric Acid | 1.1 | 1.1 |
| Sodium citrate | 0.15 | 0.15 |
| 2,4-dihydroxybenzoic acid | 0 | 0.25 |
| 3-hydroxybenzoic acid | 0 | 0.25 |
| Dicalcium sodium EDTA | 0.018 | 0.018 |
| Sodium benzoate | 0.13 | 0.13 |

Beverage compositions were prepared according to the formulations in Table 3 above. The inventive composition contained a combination of 2,4-DHB and 3-HB, whereas the control composition did not include either of the sweetener potentiators.

The high fructose corn syrup for each composition was weighed directly into a volumetric flask. For the inventive composition, 2,4-DHB and 3-HB were added and washed into the flask. Then, for each composition, the flavors were added and washed in with water. The flask was shaken well. Water was added to just below the fill line of the flask. Sodium benzoate solution was added. The volume then was made up with water. The syrup was carbonated in 250 ml bottles using 50 ml of the syrup and 200 ml carbonated water.

Upon tasting, the inventive composition demonstrated an increased sweetness intensity as compared to the control composition.

Example 10

TABLE 4

Still Beverage Containing Sweetener Potentiators 2,4-DHB, 3-HB and 3,4-DHB

| Component | Control % (w/v) | Inventive % (w/v) |
| --- | --- | --- |
| Sucrose | 5.000 | 5.000 |
| Citric acid | 0.180 | 0.180 |
| Sodium citrate | 0.040 | 0.040 |
| Peach flavor | 0.025 | 0.025 |
| 2,4-dihydroxybenzoic | 0.000 | 0.050 |
| 3-hydroxybenzoic acid | 0.000 | 0.050 |
| 3,4-dihydroxybenzoic acid | 0.000 | 0.050 |
| Water | to volume | to volume |

Beverage compositions were prepared according to the formulations in Table 4 above. The inventive composition contained 2,4-DHB, 3-HB and 3,4-DHB whereas the control composition did not include the sweetener potentiators.

The sugar, acid and citrate for each composition were added to a volumetric flask using a funnel. The flavor, for each composition, and the sweetener potentiators, for the inventive composition, were weighed and added to the flask. The flask was filled to the fill line with water. The mixture was decanted into 250 ml PET bottles and labeled.

Upon tasting, the inventive composition demonstrated an increased sweetness intensity as compared to the control composition.

Example 11

TABLE 5

Juice-Based Beverage Containing Sweetener Potentiators 2,4-DHB and 3,4-DHB

| Component | Control | Inventive |
| --- | --- | --- |
| Sucrose | 3.000 | 3.000 |
| Citric acid | 0.200 | 0.200 |
| Sodium citrate | 0.040 | 0.040 |
| 2,4 DHB | 0.000 | 0.050 |
| 3,4-DHB | 0.000 | 0.050 |
| Apple juice concentrate | 1.167 | 1.167 |
| Natural berry flavor | 0.200 | 0.200 |
| Water | to volume | to volume |

Beverage compositions were prepared according to the formulations in Table 5 above. Table 5 provides the amount in grams for each component in the formulations based on a volume of 100 ml. The inventive beverage composition contained 2,4-DHB and 3,4-DHB, which are sweetener potentiators, whereas the control did not contain the sweetness potentiators.

All components listed in Table 5, including the sweetener potentiators in the inventive composition, except the flavor were weighed and added into a volumetric flask for each composition. The flask was filled to volume with water and placed on a magnetic stirrer until all components were fully dissolved for each composition. The contents of the flask for each composition then were transferred to a plastic beaker and heated in a microwave to 90° C. The batch then was allowed to cool to 60° C. and the flavor was added while stirring. The batch was filled into 1 liter bottles and allowed to cool in a refrigerator.

Upon tasting, the inventive composition demonstrated an increased sweetness intensity as compared to the control composition.

Example 12

TABLE 6

Iced Tea Beverage Containing Sweetness Potentiators 3-HR and 3,4-DHB

| Component | Control % w/v | Inventive % w/v |
|---|---|---|
| Sucrose | 7.000 | 7.000 |
| Citric acid | 0.200 | 0.200 |
| Tea extract "Assam" | 0.120 | 0.120 |
| Lemon Juice Concentrate | 0.100 | 0.100 |
| Sodium benzoate (20% solution) | 0.075 | 0.075 |
| 3-hydroxybenzoic acid | 0.000 | 0.050 |
| 3,4-dihydroxybenzoic acid | 0.000 | 0.050 |
| Water | to volume | to volume |

Beverage compositions were prepared according to the formulations in Table 6 above. The inventive composition contained 3-HB and 3,4-DHB, which are sweetness potentiators, whereas the control composition did not include the sweetness potentiators.

All components, including the sweetness potentiators in the inventive composition, except sodium benzoate were weighed and added into a volumetric flask using a funnel for each composition. The flask for each composition was filled with water almost to the fill line and then the sodium benzoate was added. The flask was filled with water to the fill line and inverted. If necessary, the flask was placed on a magnetic stirrer until all components were fully dissolved for each composition.

Upon tasting, the inventive composition demonstrated an increased sweetness intensity as compared to the control composition.

The invention claimed is:

1. A beverage composition comprising:
   (i) at least one active substance; wherein the active substance comprises a sweetener; and wherein the sweetener consists of a sweetener selected from the group consisting of sucrose, dextrose, dextrin, maltose, xylose, ribose, fructose, maltitol, glucose, lactose, invert sugar, fructo oligo saccharide syrups, partially hydrolyzed starch, corn syrup solids, sorbitol, xylitol, mannitol, galactitol, hydrogenated isomaltulose, lactitol, erythritol, hydrogenated starch hydrolysate, L-aspartyl-L-phenylalanine methyl ester, L-alpha-aspartyl-N-(2,2,4,4-tetramethyl-3-thietanyl)-D-alaninamide hydrate, L-aspartyl-L-phenylglycine methyl ester, L-aspartyl-L-2,5-dihydrophenyl-glycine methyl ester, L-aspartyl-2,5-dihydro-L-phenylalanine; L-aspartyl-L-1-cyclohexen)-alanine, sucralose, sodium saccharin salts, calcium saccharin salts, the free acid form of saccharin, cyclamate salts, the sodium salt of 3,4-dihydro-6-methyl-1,2,3-oxathazine-4-one-2,2-dioxide, the ammonium salt of 3,4-dihydro-6-methyl-1,2,3-oxathazine-4-one-2,2-dioxide, the calcium salt of 3,4-dihydro-6-methyl-1,2,3-oxathazine-4-one-2,2-dioxide, the potassium salt of 3,4-dihydro-6-methyl-1,2,3-oxathazine-4-one-2,2-dioxide, stevia, dihydrochalcones, monellin, steviosides, rebaudioside A, glycyrrhizin, dihydroflenvenol, Thaumatin I, Thaumatin II, talin, monatin, Lo han guo, and mixtures thereof; and
   (ii) at least one taste potentiator;
   wherein said taste potentiator comprises a water-soluble taste potentiator; and wherein the water-soluble taste potentiator consists of a water-soluble taste potentiator selected from the group consisting of alapyridaine, cynarin, miraculin, glupyridaine, pyridinium-betain compounds, glutamates, trehalose, salts, such as sodium chloride, water-soluble sugar acids, potassium chloride, sodium acid sulfate, water-soluble hydrolyzed vegetable proteins, water-soluble hydrolyzed animal proteins, water-soluble yeast extracts, adenosine monophosphate (AMP), glutathione, water-soluble nucleotides, such as inosine monophosphate, disodium inosinate, xanthosine monophosphate, guanylate monophosphate, alapyridaine (N-(1-carboxyethyl)-6-(hydroxymethyl)pyridinium-3-ol inner salt, sugar beet extract, sugarcane leaf essence, curculin, strogin, mabinlin, gymnemic acid, 2-hydroxybenzoic acid, 4-hydroxybenzoic acid, 2,3-dihydroxybenzoic acid, 2,5-dihydroxybenzoic acid, 2,6-dihydroxybenzoic acid, 2,3,4-trihydroxybenzoic acid, 2,4,6-trihydroxybenzoic acid, 3,4,5-trihydroxybenzoic acid, 4-hydroxyphenylacetic acid, 2-hydroxyisocaproic acid, 3-hydroxycinnamic acid, 3-aminobenzoic acid, 4-aminobenzoic acid, and combinations thereof.

2. The beverage composition of claim 1, wherein said at least one active substance further comprises a compound selected from the group consisting of compounds that provide flavor, tartness, umami, kokumi, savory, saltiness, cooling, warmth, and tingling.

3. The beverage composition of claim 1, wherein said at least one active substance further comprises an oral care agent.

4. The beverage composition of claim 1, wherein said at least one active substance further comprises a pharmaceutical active.

5. The beverage composition of claim 1, wherein said at least one active substance further comprises a nutraceutical active.

6. A beverage composition comprising:
   at least one active substance; wherein the active substance comprises a sweetener; and wherein the sweetener consists of a sweetener selected from the group consisting of sucrose, dextrose, dextrin, maltose, xylose, ribose, fructose, maltitol, glucose, lactose, invert sugar, fructo oligo saccharide syrups, partially hydrolyzed starch, corn syrup solids, sorbitol, xylitol, mannitol, galactitol, hydrogenated isomaltulose, lactitol, erythritol, hydrogenated starch hydrolysate, L-aspartyl-L-phenylalanine methyl ester, aspartame, acesulfame-K, L-alpha-aspartyl-N-(2,2,4,4-tetramethyl-3-thietanyl)-D-alaninamide hydrate, L-aspartyl-L-phenylglycine methyl ester, L-aspartyl-L-2,5-dihydrophenyl-glycine methyl ester, L-aspartyl-2,5-dihydro-L-phenylalanine; L-aspartyl-L-1-cyclohexen)-alanine, sucralose, sodium saccharin salts, calcium saccharin salts, the free acid form of saccharin, cyclamate salts, the sodium salt of 3,4-dihydro-6-methyl-1,2,3-oxathazine-4-one-2,2-dioxide, the ammonium salt of 3,4-dihydro-6-methyl-1,2,3-oxathazine-4-one-2,2-dioxide, the calcium salt of 3,4-dihydro-6-methyl-1,2,3-oxathazine-4-one-2,2-dioxide, the potassium salt of 3,4-dihydro-6-methyl-1,2,3-oxathazine-4-one-2,2-dioxide, stevia, dihydrochalcones, monellin, steviosides, rebaudioside A, glycyrrhizin, dihydroflenvenol, Thaumatin I, Thaumatin II, talin, monatin, Lo han guo, and mixtures thereof; and (ii) at least one potentiator;

wherein said taste potentiator comprises a sweetener potentiator; wherein the sweetener potentiator consists of a sweetener potentiator selected from the group consisting of monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, sugar beet extract, thaumatin, neohesperidin dihydrochalcone, trehalose, maltol, ethyl maltol, vanilla extract, vanilla oleoresin, vanillin, sugar beet extract, sugarcane leaf essence, compounds that respond to G-protein coupled receptors (T2Rs and T1Rs), 2-hydroxybenzoic acid, 3-hydroxybenzoic acid, 4-hydroxybenzoic acid, 2,3-dihydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid, 2,3,4-trihydroxybenzoic acid, 2,4,6-trihydroxybenzoic acid, 3,4,5-trihydroxybenzoic acid, 4-hydroxyphenylacetic acid, 2-hydroxyisocaproic acid, 3-hydroxycinnamic acid, 3-aminobenzoic acid, 4-aminobenzoic acid, and combinations thereof.

7. The beverage composition of claim 6, wherein said at least one taste potentiator consists of 3-hydroxybenzoic acid and 2,4-dihydroxybenzoic acid.

8. The beverage composition of claim 7, wherein said sweetener consists of a bulk sweetener selected from the group consisting of sucrose, fructose, maltitol, and glucose.

9. The beverage composition of claim 7, where said sweetener consists of an intense sweetener selected from the group consisting of aspartame, acesulfame-K, sucralose, saccharin, and combinations thereof.

10. The beverage composition of claim 6, wherein said at least one taste potentiator consists of 3-hydroxybenzoic acid, 2,4-hydroxybenzoic acid, and 3,4-dihydroxybenzoic acid.

11. The beverage composition of claim 6, wherein said at least one taste potentiator is encapsulated.

12. The beverage composition of claim 6, wherein said at least one active substance is encapsulated.

13. The beverage composition of claim 6, wherein the sweetener is selected from the group consisting of Lo han guo, stevia, monatin, and combinations thereof.

14. A beverage composition comprising a sweetener potentiator consisting of a first amount of 3-hydroxybenzoic acid; a second amount of 2,4-dihydroxybenzoic acid; and a sweetener; wherein the sweetener consists of a sweetener selected from the group consisting of sucrose, dextrose, dextrin, maltose, xylose, ribose, fructose, maltitol, glucose, lactose, invert sugar, fructo oligo saccharide syrups, partially hydrolyzed starch, corn syrup solids, sorbitol, xylitol, mannitol, galactitol, hydrogenated isomaltulose, lactitol, erythritol, hydrogenated starch hydrolysate, L-aspartyl-L-phenylalanine methyl ester, L-alpha-aspartyl-N-(2,2,4,4-tetramethyl-3-thietanyl)-D-alaninamide hydrate, L-aspartyl-L-phenylglycine methyl ester, L-aspartyl-L-2,5-dihydrophenyl-glycine methyl ester, L-aspartyl-2,5-dihydro-L-phenylalanine; L-aspartyl-L-1-cyclohexen)-alanine, sucralose, sodium saccharin salts, calcium saccharin salts, the free acid form of saccharin, cyclamate salts, the sodium salt of 3,4-dihydro-6-methyl-1,2,3-oxathazine-4-one-2,2-dioxide, the ammonium salt of 3,4-dihydro-6-methyl-1,2,3-oxathazine-4-one-2,2-dioxide, the calcium salt of 3,4-dihydro-6-methyl-1,2,3-oxathazine-4-one-2,2-dioxide, the potassium salt of 3,4-dihydro-6-methyl-1,2,3-oxathazine-4-one-2,2-dioxide, stevia, dihydrochalcones, monellin, steviosides, rebaudioside A, glycyrrhizin, dihydroflenvenol, Thaumatin I, Thaumatin II, talin, monatin, Lo han guo, and mixtures thereof.

15. The beverage composition of claim 14, wherein said first amount is at least 200 ppm.

16. The beverage composition of claim 15, wherein said second amount is at least 200 ppm.

17. The beverage composition of claim 14, wherein at least a portion of said first amount of 3-hydroxybenzoic acid is encapsulated.

18. The beverage composition of claim 17, wherein at least a portion of said second amount of 2,4-dihydroxybenzoic acid is encapsulated.

19. The beverage composition of claim 14, wherein at least a portion of said second amount of 2,4-dihydroxybenzoic acid is encapsulated.

20. The beverage composition of claim 14, wherein said sweetener potentiator composition comprises sufficient amounts of said first amount of 3-hydroxybenzoic acid and said second amount of 2,4-dihydroxybenzoic acid to create a sucrose equivalent value of at least seven %.

21. The beverage composition of claim 14, wherein said sweetener potentiator composition comprises sufficient amounts of said first amount of 3-hydroxybenzoic acid and said second amount of 2,4-dihydroxybenzoic acid to create a sucrose equivalent value of at least eight %.

22. The beverage composition of claim 14, wherein the sweetener is selected from the group consisting of Lo han guo, stevia, monatin, and combinations thereof.

23. The beverage composition of claim 14, wherein said first amount is equal to said second amount.

24. The beverage composition of claim 23, wherein said first amount is at least 200 ppm.

25. The beverage composition of claim 23, wherein at least a portion of said first amount of 3-hydroxybenzoic acid is encapsulated.

26. The beverage composition of claim 25, wherein at least a portion of said second amount of 2,4-dihydroxybenzoic acid is encapsulated.

27. The beverage composition of claim 23, wherein at least a portion of said second amount of 2,4-dihydroxybenzoic acid is encapsulated.

28. The beverage composition of claim 23, wherein said sweetener potentiator composition comprises sufficient amounts of said first amount of 3-hydroxybenzoic acid and said second amount of 2,4-dihydroxybenzoic acid to create a sucrose equivalent value of at least seven %.

29. The beverage composition of claim 23, wherein said sweetener potentiator composition comprises sufficient amounts of said first amount of 3-hydroxybenzoic acid and said second amount of 2,4-dihydroxybenzoic acid in to create a sucrose equivalent value of at least eight %.

30. The beverage composition of claim 23, wherein the sweetener is selected from the group consisting of Lo han guo, stevia, monatin, and combinations thereof.

31. The beverage composition of claim 14, further comprising:
a flavor component.

32. The beverage composition of claim 31, wherein said first amount is equal to said second amount.

33. The beverage composition of claim 32, wherein said first amount is at least 200 ppm.

34. The beverage composition of claim 31, wherein at least a portion of said first amount of 3-hydroxybenzoic acid is encapsulated.

35. The beverage composition of claim 34, wherein at least a portion of said second amount of 2,4-dihydroxybenzoic acid is encapsulated.

36. The beverage composition of claim 31, wherein at least a portion of said second amount of 2,4-dihydroxybenzoic acid is encapsulated.

37. The beverage composition of claim 31, wherein said first amount of 3-hydroxybenzoic acid and said second amount of 2,4-dihydroxybenzoic acid are present in sufficient amounts to create a sucrose equivalent value of at least seven %.

38. The beverage composition of claim 31, wherein said first amount of 3-hydroxybenzoic acid and said second amount of 2,4-dihydroxybenzoic acid are present in sufficient amounts to create a sucrose equivalent value of at least eight %.

39. The beverage composition of claim 31, wherein the sweetener is selected from the group consisting of Lo han guo, stevia, monatin, and combinations thereof.

40. A method of maintaining a desired sweetness intensity in a beverage composition, comprising the steps of
(a) determining a desired sweetness intensity;
(b) adding a quantity of natural or artificial sweetener to a beverage composition that supplies a sweetness intensity less intense than said desired sweetness intensity; wherein the natural or artificial sweetener consists of a natural or artificial sweetener selected from the group consisting of sucrose, dextrose, dextrin, maltose, xylose, ribose, fructose, maltitol, glucose, lactose, invert sugar, fructo oligo saccharide syrups, partially hydrolyzed starch, corn syrup solids, sorbitol, xylitol, mannitol, galactitol, hydrogenated isomaltulose, lactitol, erythritol, hydrogenated starch hydrolysate, L-aspartyl-L-phenylalanine methyl ester, L-alpha-aspartyl-N-(2,2,4,4-tetramethyl-3-thietanyl)-D-alaninamide hydrate, L-aspartyl-L-phenylglycine methyl ester, L-aspartyl-L-2,5-dihydrophenyl-glycine methyl ester, L-aspartyl-2,5-dihydro-L-phenylalanine; L-aspartyl-L-1-cyclohexen)-alanine, sucralose, sodium saccharin salts, calcium saccharin salts, the free acid form of saccharin, cyclamate salts, the sodium salt of 3,4-dihydro-6-methyl-1,2,3-oxathazine-4-one-2,2-dioxide, the ammonium salt of 3,4-dihydro-6-methyl-1,2,3-oxathazine-4-one-2,2-dioxide, the calcium salt of 3,4-dihydro-6-methyl-1,2,3-oxathazine-4-one-2,2-dioxide, the potassium salt of 3,4-dihydro-6-methyl-1,2,3-oxathazine-4-one-2,2-dioxide, stevia, dihydrochalcones, monellin, steviosides, rebaudioside A, glycyrrhizin, dihydroflenvenol, Thaumatin I, Thaumatin II, talin, monatin, Lo han guo, and mixtures thereof; and
(c) adding a quantity of a sweetener potentiator composition to the beverage composition such that said desired sweetness intensity is delivered; wherein the sweetener potentiator composition consists of 3-hydroxybenzoic acid and at least one of 2,4-dihydroxybenzoic acid and 3,4-dihydroxybenzoic acid.

41. A method of increasing the sweetness intensity of a beverage composition, comprising the steps of:
(a) adding a quantity of natural or artificial sweetener to a beverage composition; wherein the natural or artificial sweetener consists of a natural or artificial sweetener selected from the group consisting of sucrose, dextrose, dextrin, maltose, xylose, ribose, fructose, maltitol, glucose, lactose, invert sugar, fructo oligo saccharide syrups, partially hydrolyzed starch, corn syrup solids, sorbitol, xylitol, mannitol, galactitol, hydrogenated isomaltulose, lactitol, erythritol, hydrogenated starch hydrolysate, L-aspartyl-L-phenylalanine methyl ester, L-alpha-aspartyl-N-(2,2,4,4-tetramethyl-3-thietanyl)-D-alaninamide hydrate, L-aspartyl-L-phenylglycine methyl ester, L-aspartyl-L-2,5-dihydrophenyl-glycine methyl ester, L-aspartyl-2,5-dihydro-L-phenylalanine; L-aspartyl-L-1-cyclohexen)-alanine, sucralose, sodium saccharin salts, calcium saccharin salts, the free acid form of saccharin, cyclamate salts, the sodium salt of 3,4-dihydro-6-methyl-1,2,3-oxathazine-4-one-2,2-dioxide, the ammonium salt of 3,4-dihydro-6-methyl-1,2,3-oxathazine-4-one-2,2-dioxide, the calcium salt of 3,4-dihydro-6-methyl-1,2,3-oxathazine-4-one-2,2-dioxide, the potassium salt of 3,4-dihydro-6-methyl-1,2,3-oxathazine-4-one-2,2-dioxide, stevia, dihydrochalcones, monellin, steviosides, rebaudioside A, glycyrrhizin, dihydroflenvenol, Thaumatin I, Thaumatin II, talin, monatin, Lo han guo, and mixtures thereof;
(b) determining a sweetness intensity derived from said quantity of said natural or artificial sweetener; and
(c) adding a quantity of a sweetener potentiator composition to the beverage composition such that said sweetness intensity is greater than the sweetness intensity derived from said natural or artificial sweetener; wherein the sweetener potentiator composition consists of 3-hydroxybenzoic acid and at least one of 2,4-dihydroxybenzoic acid and 3,4-dihydroxybenzoic acid.

42. A method of reducing the amount of natural or artificial sweeteners in a beverage composition, comprising the steps of:
(a) determining an amount of natural or artificial sweetener in a beverage composition that provides a desired sweetness intensity; wherein the natural or artificial sweetener consists of a natural or artificial sweetener selected from the group consisting of sucrose, dextrose, dextrin, maltose, xylose, ribose, fructose, maltitol, glucose, lactose, invert sugar fructo oligo saccharide syrups, partially hydrolyzed starch, corn syrup solids, sorbitol, xylitol, mannitol, galactitol, hydrogenated isomaltulose, lactitol, erythritol, hydrogenated starch hydrolysate, L-aspartyl-L-phenylalanine methyl ester, L-alpha-aspartyl-N-(2,2,4,4-tetramethyl-3-thietanyl)-D-alaninamide hydrate, L-aspartyl-L-phenylglycine methyl ester, L-aspartyl-L-2,5-dihydrophenyl-glycine methyl ester, L-aspartyl-2,5-dihydro-L-phenylalanine; L-aspartyl-L-1-cyclohexen)-alanine, sucralose, sodium saccharin salts, calcium saccharin salts, the free acid form of saccharin, cyclamate salts, the sodium salt of 3,4-dihydro-6-methyl-1,2,3-oxathazine-4-one-2,2-dioxide, the ammonium salt of 3,4-dihydro-6-methyl-1,2,3-oxathazine-4-one-2,2-dioxide, the calcium salt of 3,4-dihydro-6-methyl-1,2,3-oxathazine-4-one-2,2-dioxide, the potassium salt of 3,4-dihydro-6-methyl-1,2,3-oxathazine-4-one-2,2-dioxide, stevia, dihydrochalcones, monellin, steviosides, rebaudioside A, glycyrrhizin, dihydroflenvenol, Thaumatin I, Thaumatin II, talin, monatin, Lo han guo, and mixtures thereof;

(b) reducing said amount of natural or artificial sweetener; and (c) adding a quantity of a sweetener potentiator composition to the beverage composition such that the desired sweetness intensity is maintained; wherein the sweetener potentiator composition consists of 3-hydroxybenzoic acid and at least one of 2,4-dihydroxybenzoic acid and 3,4-dihydroxybenzoic acid.

43. A method of preparing a beverage product, comprising the steps of:

(a) providing a sweetener potentiator composition consisting of a first amount of 3-hydroxybenzoic acid and a second amount of at least one of 2,4-dihydroxybenzoic acid and 3,4-dihydroxybenzoic acid; and (b) adding the sweetener potentiator composition to a beverage composition comprising a sweetener to enhance the perception of sweetness of the beverage composition upon consumption; wherein the sweetener consists of a sweetener selected from the group consisting of sucrose, dextrose, dextrin, maltose, xylose, ribose, fructose, maltitol, glucose, lactose, invert sugar, fructo oligo saccharide syrups, partially hydrolyzed starch, corn syrup solids, sorbitol, xylitol, mannitol, galactitol, hydrogenated isomaltulose, lactitol, erythritol, hydrogenated starch hydrolysate, L-aspartyl-L-phenylalanine methyl ester, L-alpha-aspartyl-N-(2,2,4,4-tetramethyl-3-thietanyl)-D-alaninamide hydrate, L-aspartyl-L-phenylglycine methyl ester, L-aspartyl-L-2,5-dihydrophenyl-glycine methyl ester, L-aspartyl-2,5-dihydro-L-phenylalanine; L-aspartyl-L-1-cyclohexen)-alanine, sucralose, sodium saccharin salts, calcium saccharin salts, the free acid form of saccharin, cyclamate salts, the sodium salt of 3,4-dihydro-6-methyl-1,2,3-oxathazine-4-one-2,2-dioxide, the ammonium salt of 3,4-dihydro-6-methyl-1,2,3-oxathazine-4-one-2,2-dioxide, the calcium salt of 3,4-dihydro-6-methyl-1,2,3-oxathazine-4-one-2,2-dioxide, the potassium salt of 3,4-dihydro-6-methyl-1,2,3-oxathazine-4-one-2,2-dioxide, stevia, dihydrochalcones, monellin, steviosides, rebaudioside A, glycyrrhizin, dihydroflenvenol, Thaumatin I, Thaumatin II, talin, monatin, Lo han guo, and mixtures thereof.

44. The method of claim 43, wherein said first amount is equal to said second amount.

45. The method of claim 43, wherein the beverage composition further comprises a flavor component.

46. The method of claim 43, wherein said sweetener potentiator composition enhances the perception of sweetness of the beverage composition to a sucrose equivalent value of at least seven %.

47. The method of claim 43, wherein said sweetener potentiator composition enhances the perception of sweetness of the beverage composition to a sucrose equivalent value of at least eight %.

48. A beverage composition comprising:

(i) at least one active substance; wherein the active substance comprises a sweetener; and wherein the sweetener consists of a sweetener selected from the group consisting of sucrose, dextrose, dextrin, maltose, xylose, ribose, fructose, maltitol, glucose, lactose, invert sugar, fructo oligo saccharide syrups, partially hydrolyzed starch, corn syrup solids, sorbitol, xylitol, mannitol, galactitol, hydrogenated isomaltulose, lactitol, erythritol, hydrogenated starch hydrolysate, L-aspartyl-L-phenylalanine methyl ester, L-alpha-aspartyl-N-(2,2,4,4-tetramethyl-3-thietanyl)-D-alaninamide hydrate, L-aspartyl-L-phenylglycine methyl ester, L-aspartyl-L-2,5-dihydrophenyl-glycine methyl ester, L-aspartyl-2,5-dihydro-L-phenylalanine; L-aspartyl-L-1-cyclohexen)-alanine, sucralose, sodium saccharin salts, calcium saccharin salts, the free acid form of saccharin, cyclamate salts, the sodium salt of 3,4-dihydro-6-methyl-1,2,3-oxathazine-4-one-2,2-dioxide, the ammonium salt of 3,4-dihydro-6-methyl-1,2,3-oxathazine-4-one-2,2-dioxide, the calcium salt of 3,4-dihydro-6-methyl-1,2,3-oxathazine-4-one-2,2-dioxide, the potassium salt of 3,4-dihydro-6-methyl-1,2,3-oxathazine-4-one-2,2-dioxide, stevia, dihydrochalcones, monellin, steviosides, rebaudioside A, glycyrrhizin, dihydroflenvenol, Thaumatin I, Thaumatin II, talin, monatin, Lo han guo, and mixtures thereof; and (ii) at least one taste potentiator;

wherein said taste potentiator consists of a water-insoluble taste potentiator selected from the group consisting of citrus aurantium, vanilla oleoresin, water insoluble sugar acids, water insoluble hydrolyzed vegetable proteins, water insoluble hydrolyzed animal proteins, water insoluble yeast extracts, insoluble nucleotides, and combinations thereof.

49. A beverage composition comprising:

(i) at least one active substance; wherein the active substance comprises a sweetener; and wherein the sweetener consists of a sweetener selected from the group consisting of sucrose, dextrose, dextrin, maltose, xylose, ribose, fructose, maltitol, glucose, lactose, invert sugar, fructo oligo saccharide syrups, partially hydrolyzed starch, corn syrup solids, sorbitol, xylitol, mannitol, galactitol, hydrogenated isomaltulose, lactitol, erythritol, hydrogenated starch hydrolysate, L-aspartyl-L-phenylalanine methyl ester, L-alpha-aspartyl-N-(2,2,4,4-tetramethyl-3-thietanyl)-D-alaninamide hydrate, L-aspartyl-L-phenylglycine methyl ester, L-aspartyl-L-2,5-dihydrophenyl-glycine methyl ester, L-aspartyl-2,5-dihydro-L-phenylalanine; L-aspartyl-L-1-cyclohexen)-alanine, sucralose, sodium saccharin salts, calcium saccharin salts, the free acid form of saccharin, cyclamate salts, the sodium salt of 3,4-dihydro-6-methyl-1,2,3-oxathazine-4-one-2,2-dioxide, the ammonium salt of 3,4-dihydro-6-methyl-1,2,3-oxathazine-4-one-2,2-dioxide, the calcium salt of 3,4-dihydro-6-methyl-1,2,3-oxathazine-4-one-2,2-dioxide, the potassium salt of 3,4-dihydro-6-methyl-1,2,3-oxathazine-4-one-2,2-dioxide, stevia, dihydrochalcones, monellin, steviosides, rebaudioside A, glycyrrhizin, dihydroflenvenol, Thaumatin I, Thaumatin II, talin, monatin, Lo han guo, and mixtures thereof; and (ii) at least one taste potentiator;

wherein said taste potentiator consists of a slightly water-soluble taste potentiator selected from the group consisting of maltol, ethyl maltol, vanillin, slightly water-soluble sugar acids, slightly water-soluble hydrolyzed vegetable proteins, slightly water-soluble hydrolyzed animal proteins, slightly water-soluble yeast extracts, slightly water-soluble nucleotides, and combinations thereof.

50. A beverage composition comprising:

(i) at least one active substance; wherein the active substance comprises a sweetener; and wherein the sweetener consists of sucrose; and (ii) at least one taste potentiator;

wherein said taste potentiator consists of a first amount of 3-hydroxybenzoic acid and a second amount of 3,4-dihydroxybenzoic acid.

* * * * *